(12) United States Patent
Teijido et al.

(10) Patent No.: US 7,314,279 B2
(45) Date of Patent: Jan. 1, 2008

(54) IMAGE GENERATION UNIT

(75) Inventors: Juan Manuel Teijido, Kernen (DE); Frederic Ludley, Stuttgart (DE); Nadin Roesler, Kornwestheim (DE); Olivier Ripoll, Esslingen (DE)

(73) Assignee: Sony Deutschland GmbH, Cologne (DE)

( * ) Notice: Subject to any disclaimer, the term of this patent is extended or adjusted under 35 U.S.C. 154(b) by 343 days.

(21) Appl. No.: 11/089,315

(22) Filed: Mar. 24, 2005

(65) Prior Publication Data

US 2005/0213046 A1 Sep. 29, 2005

(30) Foreign Application Priority Data

Mar. 26, 2004 (EP) .................. 04007442

(51) Int. Cl.
G03B 21/00 (2006.01)
G03B 21/28 (2006.01)
(52) U.S. Cl. .............. 353/31; 353/33; 353/81
(58) Field of Classification Search ............. 353/30, 353/31, 33, 81
See application file for complete search history.

(56) References Cited

U.S. PATENT DOCUMENTS

| | | | |
|---|---|---|---|
| 5,355,187 A | | 10/1994 | Ogino et al. |
| 5,394,204 A | * | 2/1995 | Shigeta et al. ............. 353/31 |
| 5,398,086 A | * | 3/1995 | Nakano et al. ............. 353/31 |
| 6,508,571 B2 | * | 1/2003 | Chuang ..................... 362/237 |
| 6,552,754 B1 | * | 4/2003 | Song et al. ................. 348/750 |
| 2001/0000973 A1 | * | 5/2001 | Kusano et al. ............. 353/81 |
| 2002/0176054 A1 | * | 11/2002 | Mihalakis ................. 353/31 |
| 2003/0021530 A1 | | 1/2003 | Li |
| 2003/0202159 A1 | * | 10/2003 | Cobb et al. ............... 353/31 |

FOREIGN PATENT DOCUMENTS

| | | |
|---|---|---|
| EP | 0 763 945 | 3/1997 |
| EP | 1 357 761 | 10/2003 |
| WO | WO 02/080136 | 10/2002 |

* cited by examiner

*Primary Examiner*—Rodney Fuller
(74) *Attorney, Agent, or Firm*—Oblon, Spivak, McClelland, Maier & Neustadt, P.C.

(57) ABSTRACT

An image generation unit (10) is proposed comprising a first, a second, and a third light source unit (S1, S2, S3) which are adapted in order to generate an emit respective first, second, and third primary illumination light components (Lr1, Lg1, Lb1). An image generation and light re-directing arrangement (IGR) is provided which is adapted in order to generate first, second and third partial images (Ir, Ig, Ib) for an image (I) to be displayed and in order to generate first, second, and third projection light components (Lpr, Lpg, Lpb) as light of said first, second, and third partial images (Ir, Ig, Ib), respectively and in order to emit said projection light components (Lpr, Lpg, Lpb) as light of said first, second, and third partial images (Ir, Ig, Ib), respectively into an essentially common output direction (XO), wherein said first, second and third light source units (S1, S2, S3) are arranged in order to emit said first, second and third primary illumination light components (L1$r$, L1$g$, L1$b$) into an essentially common input direction (XI).

36 Claims, 21 Drawing Sheets

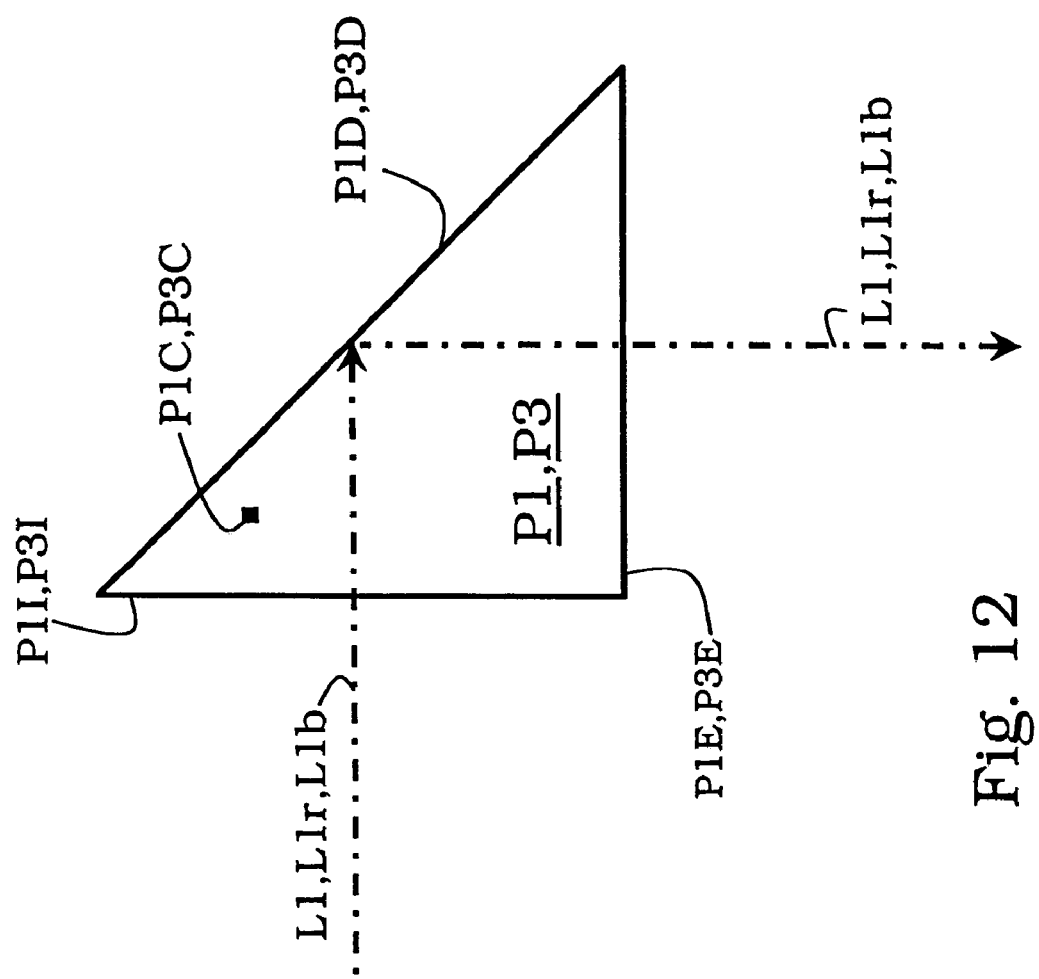

IMAGE GENERATION UNIT

The present invention relates to an image generation unit. More particularly the present invention relates to an image generation unit with a particular compact structure.

Imaging systems or imaging devices for generating and displaying an image comprise an image generation unit for generating the image to be displayed. Such an image generation unit comprises a first, a second, and a third light source unit which are adapted and/or arranged in order to generate and emit respective first, second, and third primary illumination light components of primary illumination light as light for a first, a second, and a third partial image to be generated for an image to be displayed. Additionally an image generation and light re-directing arrangement is provided which is adapted and/or arranged in order to receive said first, second, and third primary illumination light components or a derivative thereof in order to generate said first, second, and third partial images for said image to be displayed and to generate first, second, and third projection light components as light of said first, second, and third partial images, respectively and in order to emit said first, second, and third projection light components as light of said first, second, and third partial images, respectively, into or along an essentially common output direction or output axis and in particular into or along an essentially common particular output path.

A difficulty and problem with respective to common image generation units arises from the fact that the coupling of said first, second, and third primary illumination light components at present needs a certain amount of space and the mechanisms for the coupling process are spread over or distributed over a certain amount of space. Therefore, common image generation units suffer from the fact that they are comparably bulky in their structure.

It is an object of the present invention to provide an image generation unit with a comparable space saving structure in particular with respect to the coupling mechanisms for the primary illumination light components.

The object is achieved by an image generation unit according to the present invention with the features of independent claim 1. Preferred embodiments of the inventive image generation unit are within the scope of the dependent subclaims.

The inventive image generation unit as described in the introductory part above and of independent claim 1 is further characterized in that said first, second, and third light source units are arranged and/or adapted in order to emit said first, second, and third primary illumination light components of said primary illumination light or a derivative thereof into or along an essentially common input direction.

According to this particular and inventive measure it is possible to arrange said first, second, and third light source units within an reduced spatial extension as it is not necessary anymore to have said first, second, and third primary illumination light components enter the provided image generation and light re-directing arrangement from different spatial directions.

It is therefore a key aspect of the present invention to reduce the space consumption of an image generation unit by adapting and/or by arranging said first, second, and third light source units in a way that it is possible to emit said first, second, and third primary illumination light components of said primary illumination light or a derivative thereof into or along an essentially common input direction, which is in particular common for all of said first, second, and third primary illumination light components. Therefore it is possible to arrange said first, second, and third light source units within a limited spatial region which is also reduced when compared to common image generation units. According to a preferred embodiment of the present invention said first, second, and third light source units are arranged and/or adapted in order to emit said first, second, and third primary illumination light components of said primary illumination light or a derivative thereof essentially in parallel with respect to each other. According to this measure the spatial extension necessary for said first, second, and third light source units and of the optical paths thereof can further be limited and reduced.

It is of further advantage for said inventive image generation unit, to arrange and/or to adapt said image generation and light re-directing arrangement in order to receive said first, second, and third primary illumination light components from an essentially common direction, in particular from said essentially common input direction.

According to a further preferred and advantageous embodiment of the inventive image generation unit said image generation and light re-directing arrangement is arranged and/or adapted in order to receive said first, second, and third primary illumination light components via a common light incidence section or light incidence face thereof.

Additionally or alternatively the arrangement or entirety of said first, second, and third light source units and said image generation and light re-directing arrangement has essentially the same or comparable optical extension or entendue.

Further additionally or alternatively, said image generation and light re-directing arrangement comprises a first, a second, and a third image generation unit which are adapted and/or arranged in order to receive said first, a second, and a third primary illumination light components respectively or a derivative thereof and in order to generate and emit secondary illumination light components or secondary illumination light as light of said first, second, and third partial images, respectively.

According to a further additional or alternative embodiment of the inventive image generation unit said first, second, and third image generation unit means are transmittive or reflective micro displays.

It is preferred to provide between said first, second and/or third light source units in said image generation and light re-directing arrangement a first, a second, and/or a third light collecting and integrating unit, respectively. These first, second and/or third light collecting and integrating units are adapted and/or arranged in order to receive, integrate and uniformize said first, second and/or third primary illumination light components, respectively of said primary illumination light or a derivate thereof as to emit and direct said first, second, and/or third primary illumination light components, respectively of said primary illumination light or a derivative thereof as said light for said first, second, and third partial images, respectively, to be generated to said image generation and light re-directing arrangement and in particular to its light incidence section or face thereof. According to this particular realization of the present invention a particular uniform light distribution for said first, second, and third primary illumination light components can be achieved.

Further additionally or alternatively, in this case said first, second, and/or third light collecting and/or integrating unit are arranged and/or adapted in order to have an essentially common orientation, direction, and/or emission direction for said integrated primary illumination light components.

According to a further aspect of the present invention said first, second, and third light collecting and integrating units are plain or hollow light pipes and/or integration rods each in particular having a light incidence face and opposing light exit face which are in particular essentially parallely oriented with respect to each other.

Further in this case it may be provided that said first, second, and third light collecting and integrating units have an essentially constant cross-section along their respective optical axis in particular with essentially identical light incidence faces and light exit faces.

According to a further preferred embodiment said first, second, and third light collecting and integrating units are tapered and in particular have an essentially and in particular monotonically increasing cross-section along the respective optical axis when taken from their respective light incidence face to their respective light exit face, in particular of pyramidal form.

It is of additional or alternative advantage when said first, second, and third light collecting and integration units are arranged and/or adapted in order to have beam shaping properties and/or functionalities with respect to the first, second, and third primary illumination light components of said primary illumination light.

In this case, it is of further advantage to realize said beam shaping properties and/or functionalities of said first, second, and third light collecting and integration unit via their geometrical properties and/or the shape or the profile of the respective light exit faces of said first, second, and third light collecting and integration unit, respectively.

Preferably, the respective light exit faces of said first, second, and third light collecting and integration units or a part or parts thereof have a shape or profile chosen from the group of shapes or profiles which consists of concave, piece-wise concave, convex, piece-wise convex, piece-wise flat, spherical, elliptical, polynomial, fresnel-type shapes or profiles or any combination thereof.

Additionally or alternatively, the respective light exit faces of said first, second, and third light collecting and integration units or a part or parts thereof are or comprise a diffractive optical element.

According to a further advantageous embodiment of the present invention said image generation and light re-directing arrangement comprises a light combination and re-directing unit which is adapted and/or arranged in order to receive said first, second, and third secondary illumination light components, respectively of said secondary illumination light or a derivative thereof as light of said first, second, and third partial images, respectively. Additionally, said light combination and re-directing unit is further adapted and/or arranged in order to re-direct and emit said first, second, and third secondary illumination light components, respectively, of said secondary illumination light or a derivative thereof as light of said first, second, and third partial images, respectively, into or along said essentially common output direction or output axis and in particular into or along said essentially common optical output path and in particular as said first, second, and third projection light components, respectively of said first, second, and third partial images respectively.

Said light combination and re-directing unit may comprise a first face which is arranged and/or adapted in order to receive said first secondary illumination light component of said secondary illumination light or a derivative thereof as light of said first partial image in particular directly or indirectly from said light incidence section or light incidence face of said image generation and light re-directing arrangement.

Accordingly, said light combination and re-directing unit may comprise a second face which is arranged and/or adapted in order to receive said second secondary illumination light component of said secondary illumination light or a derivative thereof as light of said second partial image in particular directly or indirectly from said light incidence section of said image generation and light re-directing arrangement.

Further said light combination and re-directing unit may comprise a third face which is arranged and/or adapted in order to receive said third secondary illumination light component of said secondary illumination light or a derivative thereof as light of said third partial image in particular directly or indirectly from said light incidence section of said image generation and light re-directing arrangement.

Additionally or alternatively said light combination and re-directing unit may comprise a fourth face which is arranged and/or adapted in order to output said received first, second, and third secondary illumination light components of said secondary illumination light or a derivative thereof as light of said first, second, and third partial images, respectively to said light exit section of said image generation and light re-directing arrangement in particular essentially into or along said essentially common output direction or output axis and further in particular into or along said essentially common optical output path.

Additionally, said light combination and/or re-directing unit may comprise a spectral and/or polarization selective or selecting interface. Said polarization selective or selecting interface is adapted and/or arranged in order to reflect said first secondary illumination light component of said secondary illumination light or a derivative thereof as light of said first partial image from said first face of said light combination and re-directing unit to said fourth face of said light combination and re-directing unit. Additionally, said spectral and/or polarization selective or selecting interface may be adapted and/or arranged in order to transmit said second secondary illumination light component of the secondary illumination light or a derivative thereof as light of said second partial image from said second face of said light combination and re-directing unit to said fourth face of said light combination and re-directing unit. Further on, said spectral and/or polarization selective or selecting interface may be arranged and/or adapted in order to reflect said third secondary illumination light component of said secondary illumination light or a derivative thereof as light of said third partial image from said third face of said light combination and re-directing unit to said fourth face of said light combination and re-directing unit.

According to a further embodiment of the present invention said second face of said light combination and re-directing unit is oriented essentially parallely to said light incidence section of said image generation and light re-directing arrangement or it is provided as a part thereof.

Additionally or alternatively said fourth face of said light combination and re-directing unit is oriented essentially parallely to said light exit section of said image generation and light re-directing arrangement or it is provided as a part thereof.

According to a further preferred embodiment of the inventive image generation unit said first face and/or said third face of said light combination and re-directing unit are oriented essentially perpendicularly to said light incidence section and/or to said light exit section of said image generation and light re-directing arrangement.

It is of further advantage to orient said first and second faces of said light combination and re-directing unit essentially parallely with respect to each other, and essentially perpendicularly with respect to said second and/or said fourth face of said light combination and re-directing unit.

According to a further preferred embodiment of the inventive image generation unit said second and fourth faces of said light combination and re-directing unit are oriented essentially parallely with respect to each other and/or essentially perpendicularly with respect to said first and/or said third face of said light combination and re-directing unit.

It is of particular advantage if said light combination and re-directing unit is adapted as a colour cube or comprises a colour cube.

According to a further preferred embodiment of the inventive image generation unit, said first, second and/or third face of said light combination and re-directing unit and said first, second and/or light source unit, respectively, have in between a first, second and/or third deflecting unit, respectively, which are arranged and/or adapted in order to deflect said first, second, and/or third primary illumination light component, respectively, of said primary illumination light or a derivative thereof as light for said first, second, and/or third partial image, respectively, to be generated or said first, second, and/or third secondary illumination light component, respectively, of said secondary illumination light or a derivative thereof as light of said first, second, and/or third partial image, respectively, from said essentially common input direction or input axis to said first, second and/or third face, respectively, of said light combination and re-directing unit.

A particular simple structure is obtained in this case when according to a further preferred embodiment of the inventive image generation unit said first, second, and/or third deflecting unit is or comprises a first, second and/or third prism, respectively. Alternatively, mirrors can be used.

According to a advantageous embodiment of the present invention said first and/or said third prisms are 90° prisms.

Additionally or alternatively, said first and/or said third prisms are triangular prisms.

According to a further alternative or additional embodiment of the present invention said first and/or said third prisms have a light incidence face or section and/or a light exit face or section which are optically polished.

Additionally or alternatively, according to a further preferred embodiment of the present invention said first and/or said third prisms have upper and lower cover faces or sections which are optically polished in order to ensure or realize total internal reflection properties at the respective upper and lower cover faces or sections.

It is of further advantage to have in said first and/or in said third prisms a diagonal face or section which has mirror properties or reflecting properties with respect to the inside of the respective prism in order to ensure internal reflection at the respective diagonal face or section.

As a further alternative said first, second, and/or third deflecting unit may be or may comprise said first, second, and/or said third image generation means, respectively.

In addition or alternatively in this case said first, second, and/or said third deflecting unit may comprise a respective first, second, and/or third beam splitting arrangement together with said first, second, and/or third image generation means.

Between said first and/or said third light collecting and integrating units on the one hand and said first and/or said third deflecting units, respectively, on the other hand a respective air gap structure or air gap may be provided in order to enhance the light collecting properties of the respective first and/or third light collecting and integration units.

Additionally or alternatively, it is possible to provide between said first and/or said third deflecting units on the one hand and said lights recombination and redirecting unit on the other hand a respective air gap structure or air gap in order to enhance the light collecting properties with respect to said light recombination and redirection unit.

These and further aspects of the present invention will become more elucidated by taking reference to the following remarks:

The present invention inter alia relates to an image projection or generation/generating unit or device.

The proposed invention is a compact color image projection display using electronic light sources such as light emitting diodes. Light is homogenized by a tapered light pipe whose exit face is a beam shaping element. The purpose of this beam-shaping light pipe is to ensure that the light distributions on screen due to the three channels are the same, uniform and maximum. The three color channels—two of which are folded—are recombined to produce the color image.

In some prior art (1), an optical element is applied at the output of a light pipe, but it is a field lens and its function is not designed to control the spatial distribution of directions exiting the light pipe, just the overall direction of the light. Additionally, the device is made of two distinct (although not separated) elements: a hollow light pipe and a lens.

In another prior art system (2) the distribution of direction is corrected by a one-piece light pipe. The differences to our proposed solution is the overall setup (no elliptical reflector such as in the claims) and the fact that we propose also the use of non curved surfaces (such as Fresnel, faceted or diffractive structures). Also the claims are made for the gas discharging light sources like UHP lamps or other wide band sources, but not LED, lasers or narrow band sources.

Note that our invention consists in using the beam shaping light pipe to correct the non-uniform light distribution generated by a folded projector.

Tapered light pipes generate uniform light distribution and the end of the light pipe. Nevertheless the direction of the rays at the end of the pipe is not uniform. This results in non uniform distribution when the light propagates further after the light pipe. For the projection setups, this translates into non uniform distributions on screen.

The invention intends to solve the following problems:
1) Improved uniformity distribution (colour and grey scale) on screen.
2) Relaxed longitudinal tolerances between light pipe and micro-display.
3) Possibility to have a three path projector with non equal optical path lengths (i.e. R, Ir and B, Ib paths with folder prism Pi, and G, Ig path without prism).
4) Improved light collection efficiency within the aperture of the optics.
5) Provision of a reduced size for a three path t-LCD projector.

In order to reduce size of e.g. a LCD projector as an image generation/generating unit in the sense of the invention from the configuration presented in FIG. 1A it is according to one aspect of the present invention proposed to use prisms for the lateral channels resulting in the configuration as shown in of FIG. 1B.

The original projector consists of three light sources Si (i=1,2,3) coupled into light pipes LPi (i=1,2,3). The output of the pipes LPi (i=1,2,3) illuminates a respective micro displays Di. The three color channels are merged by a color cube CC and projected onto the screen through an objective O. In order to fold the optical paths of the lateral channels, we use prisms Pi between light pipes LPi and displays Di.

The light pipes of FIG. 1B have equal respective entrance and exit faces LPiI and LPiE (i=1,2,3) and dimensions thereof resulting in homogenisation of the distribution of light power. Besides, sometimes a collimation functionality is desired in order to make use of most of the light emitted by the respective light sources Si (i=1,2,3). Indeed, the light radiating from the sources Si (i=1,2,3) for instance show a Lambertian distribution as is illustrated in FIG. 2A. The objective O will only project on the screen the amount of light whose direction is included into a solid angle defined by the f-number or the numerical aperture which is indicated by the dashed cone. All of the light outside this angle is lost. Hence, there is a need to collimate light emerging from the sources as is shown via the distribution of FIG. 2B.

This can be done by using a tapered light pipe LPi (i=1,2,3)—such as the one illustrated in FIG. 3A—instead of a parallel one shown in FIG. 1B. A possible modified set up is presented in FIG. 3B.

Additionally to the homogenisation of the distribution of power, parallel light pipes also homogenize the distribution of direction of light. This means—as shown in FIG. 4A—that at the output of the pipe LPi (i=1,2,3) the average directions of the light rays represented by the arrows are the same for all other the exit face LPiE (i=1,2,3). The light rays are not well collimated, though, and their individual directions are contained inside a solid angle represented by the cones surrounding the arrows. A tapered light pipe on the other hand does homogenize the distribution of power and does collimate the light as is shown in FIG. 4B. There, the cones are narrower. But unfortunately, the average directions of the rays are not uniform anymore for all other rays at the exit face LPiE (i=1,2,3). The directions tend to be straight along the optical axis and oblique at the edge of the face.

The consequences of such inhomogeneity are as follows:
1) The coupling between the light pipe and the objective is not maximum, lowering the efficiency of the system.
2) If the micro-display Di is located at the exit of the light pipe, the non uniform direction distribution results, after projection by the objective lens O, into a non uniform light distribution on the screen. The brightness of the image on the screen tends to be dimmed on the sides, as shown in FIG. 5(a).
3) If the display is located after the prisms Pi, the distribution of energy on the micro-display and on the screen are not uniform anymore. The profile is different from the one obtained for the channel that uses no prism (channel 2). This results in an additional non-uniform colour distribution.

The last point can be compensated by the introduction of a cube C2 after the light pipe LP2, as shown in FIG. 6A. The dimensions of this cube C2 are chosen so that the optical path through the cube is the same as the optical path through the prisms P1 and P3. The cube can thus be seen as an unfolded prism. The colour uniformity is restored, but the brightness (grey level) is still not uniform.

To compensate for the non homogeneous distribution of directions at the exit face, we further introduce a light pipe whose exit face realizes a beam shaping functionality, noted LPi' (i=1,2,3) in FIG. 6B. Since this new light pipe generates a beam which is collimated, and uniform in power and directions, the point 2) is corrected, as illustrated in FIG. 5B. Additionally, since the point 3) is suppressed in theory, the corrective cube C2 is no longer mandatory, although its presence can still improve the result in presence of some inaccuracies in the design and fabrication of the light pipe LP'.

The light pipe LP' also increases the overall efficiency of the system, as the collected light within the aperture of the optics is bigger than the light collected with the original light pipe. It presents thus an interest for configuration where the display is not located at the exit face, such as the liquid crystal on silicon (LCOS) and the micro electro mechanical system (MEMS) of FIG. 7. The phase modulation introduced by the light pipe can be computed so that the distribution of direction is not uniform, but instead maximizes the intensity on the display. This can result in a distribution of directions at the exit face that is not homogeneous, but converging on the display.

To realize the beam shaping functionality, we use either a faceted exit face, a smooth face, a Fresnel type element (piecewise smooth), or a diffractive function, as illustrated in FIG. 8. Since the redirection is related to the measured directions of rays at the exit face and the light pipe may not be symmetric (around the optical axis, or equal in transverse directions), the structure of the beam shaping element may or may not be symmetric either.

The system allows to design very compact three path projectors by using folded configurations. The requirements in grey and colour uniformity of folded projectors cannot be achieved when using standard light pipe. Our proposal to use beam shaping light pipes allow to achieve both: compactness and high image quality.

In the following, the present invention will be elucidated in more detail by taking reference to the accompanying Figures.

FIGS. 1A, B are schematical and cross-sectional views of a prior art image generation unit and of an embodiment of the present invention, respectively.

FIGS. 2A, B demonstrate different radiation characteristics which might be used in embodiments of the present invention.

Figure 4A:
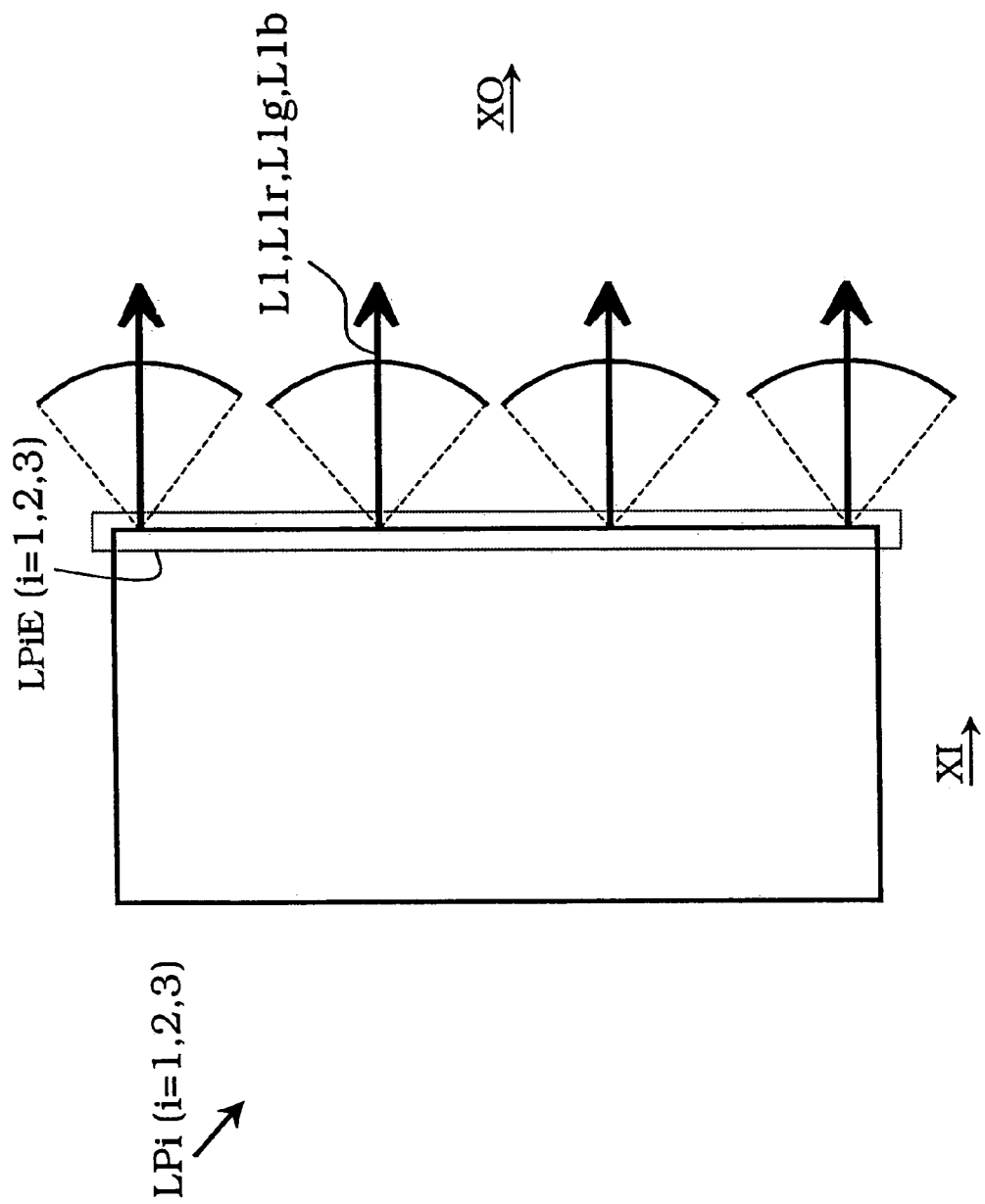

FIGS. 4A, B demonstrate different radiation characteristics of light output sections of different light collecting and integrating units which might be used in accordance with the present invention.

Figure 4B:
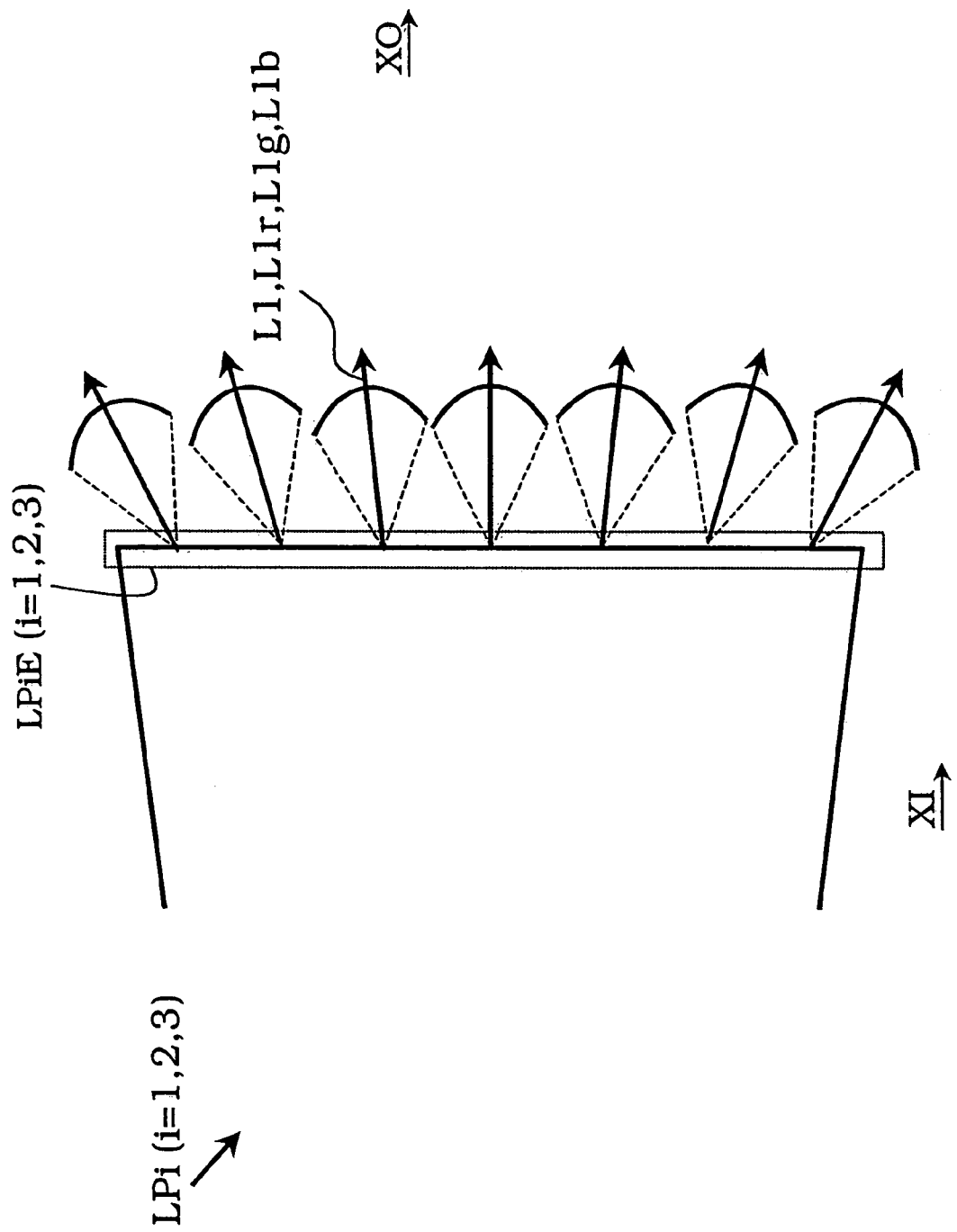
Figure 5A:
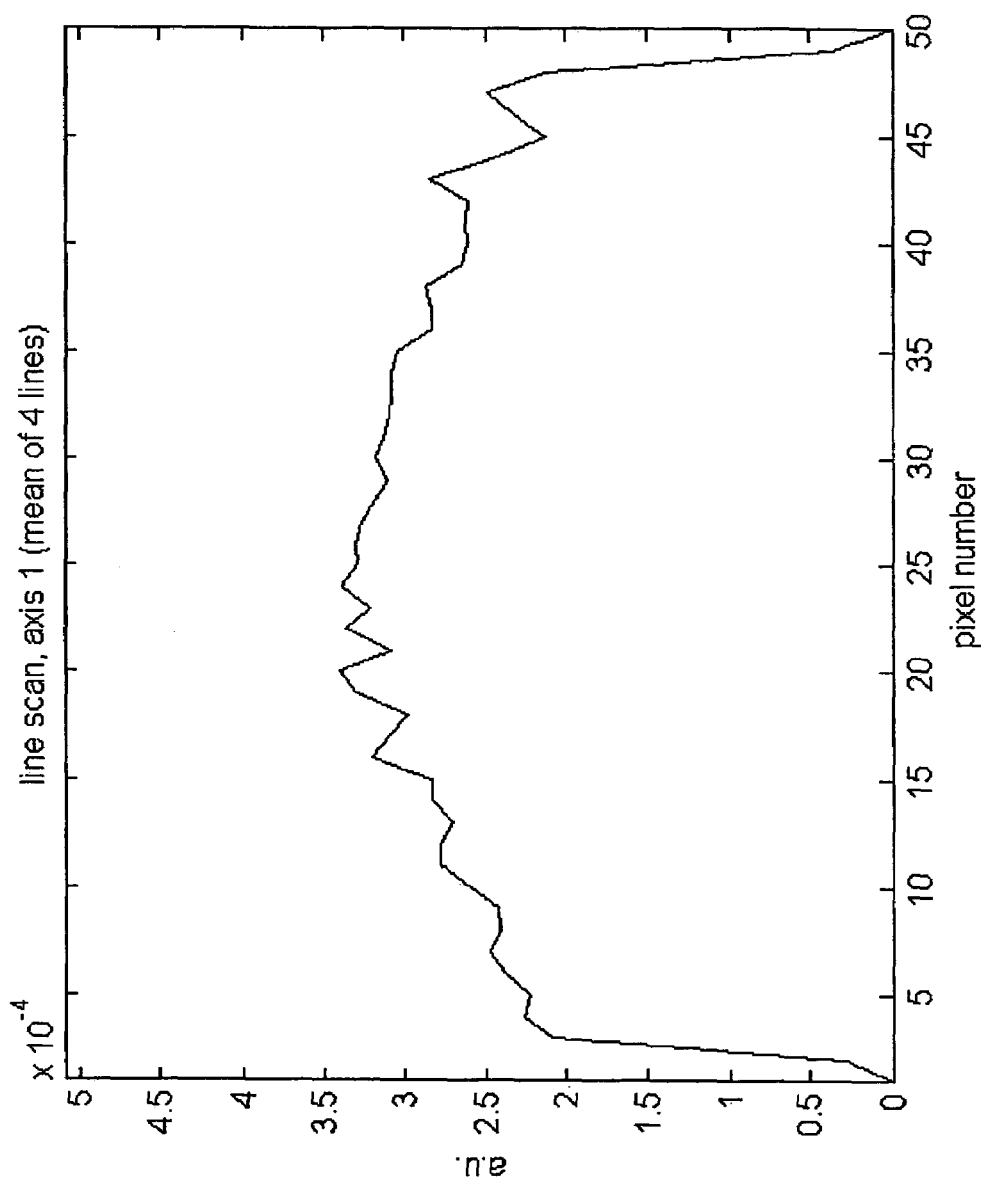
Figure 5B:
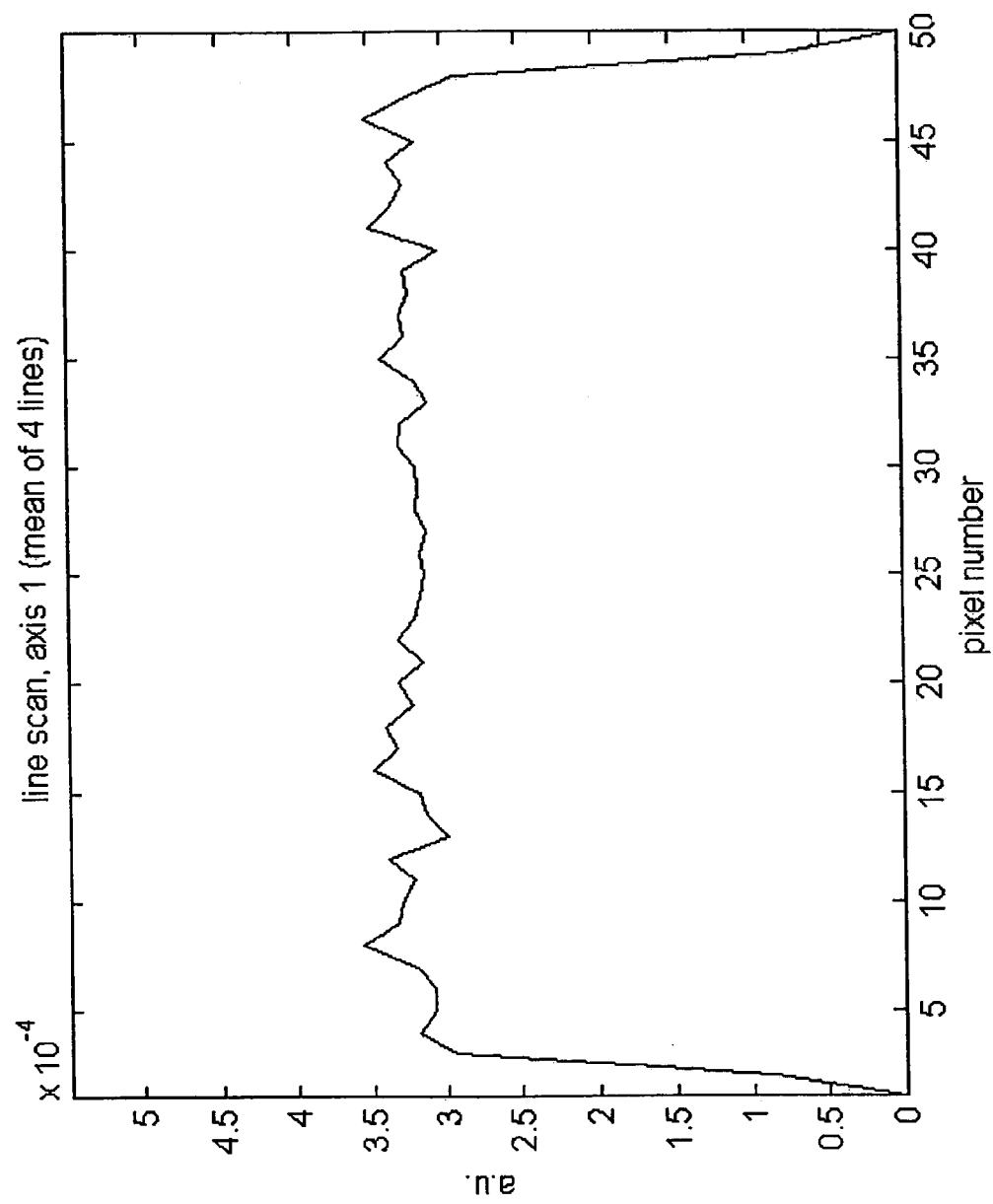

FIGS. 5A, B demonstrate radiation distributions which might be obtained in accordance with the radiation characteristics shown in FIGS. 4A and 4B, respectively.

Figure 6A:
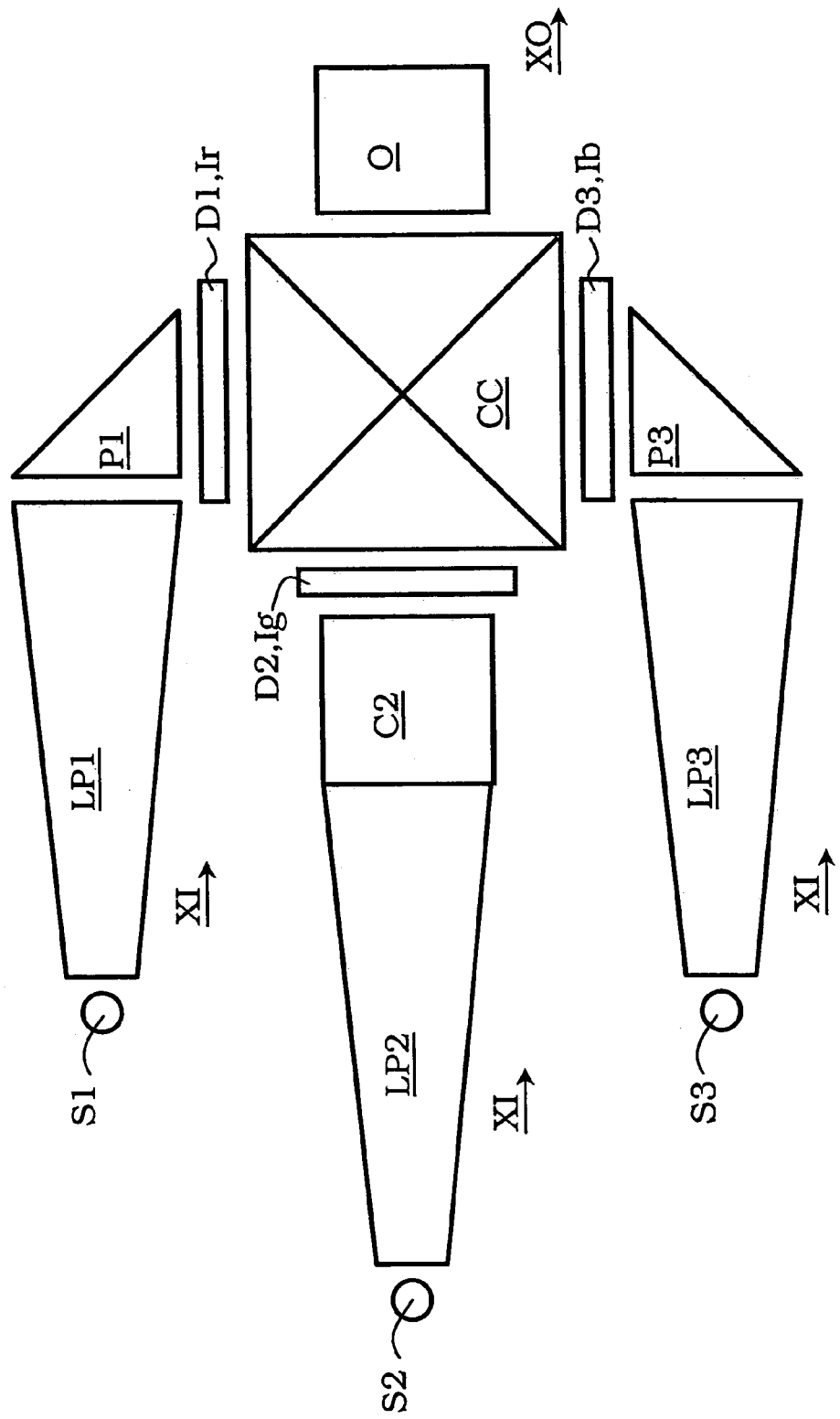
Figure 6B:
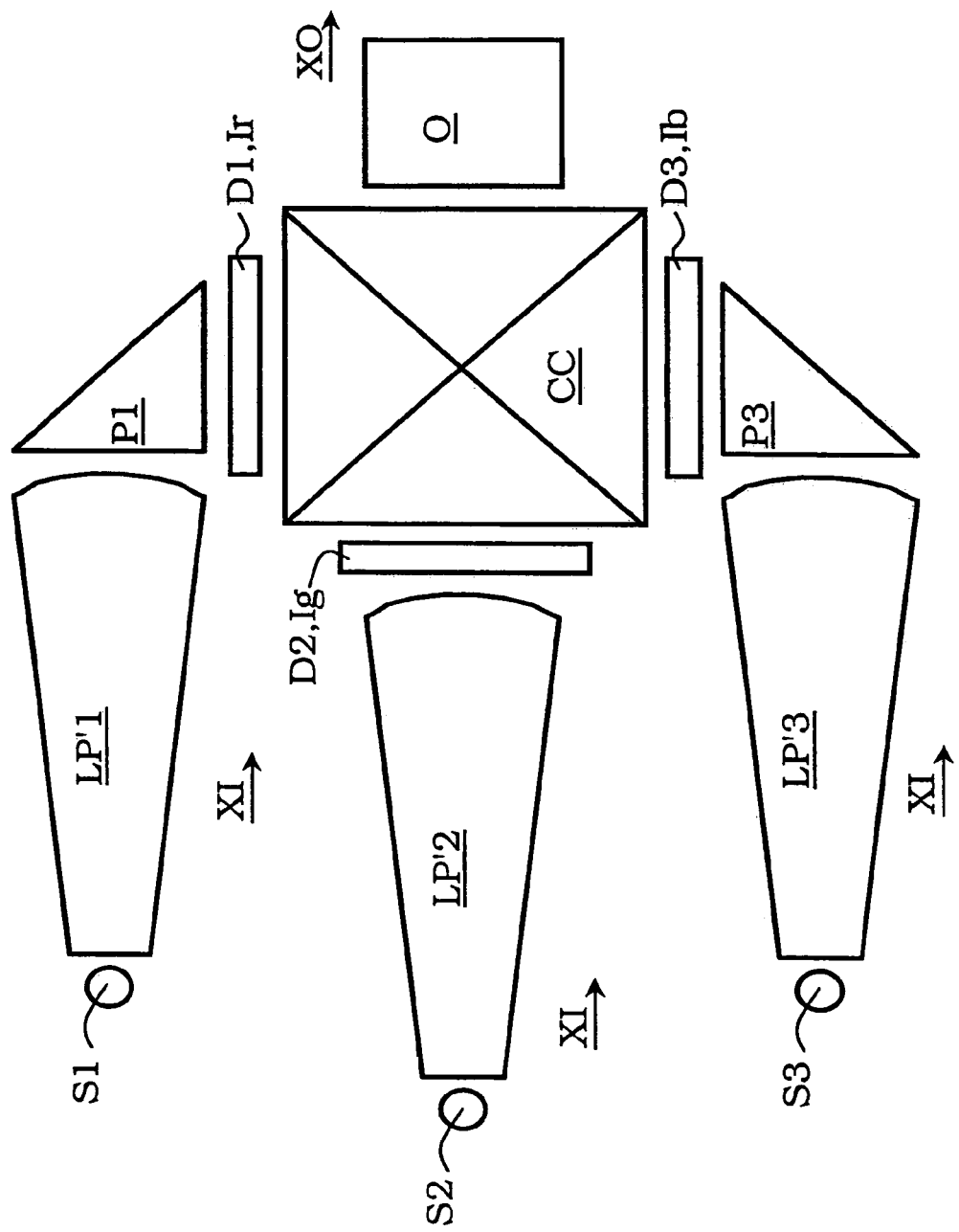

FIGS. 6A, B are schematical and cross-sectional views of two further embodiments of the inventive image generation unit.

Figure 7A:
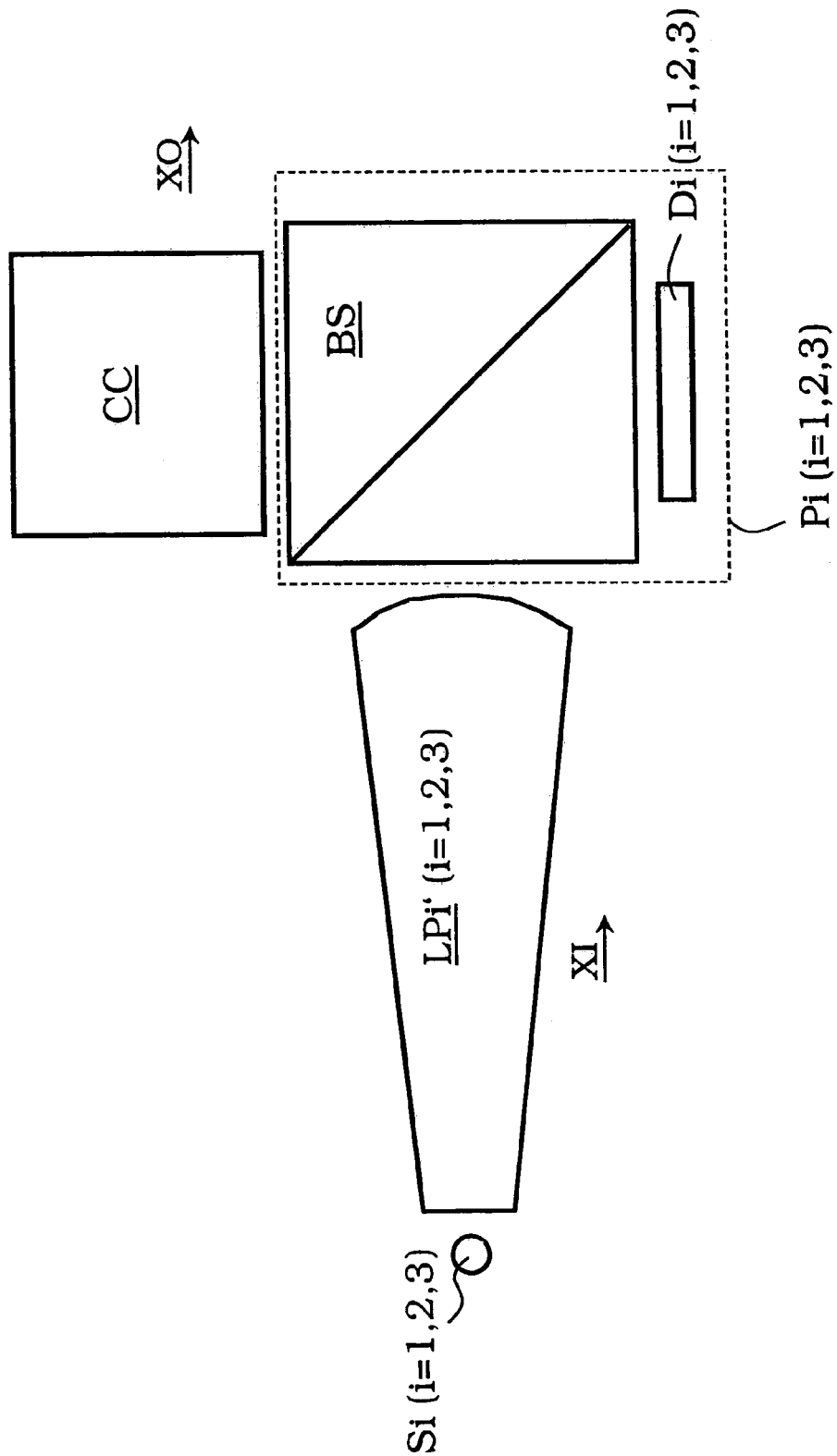
Figure 7B:
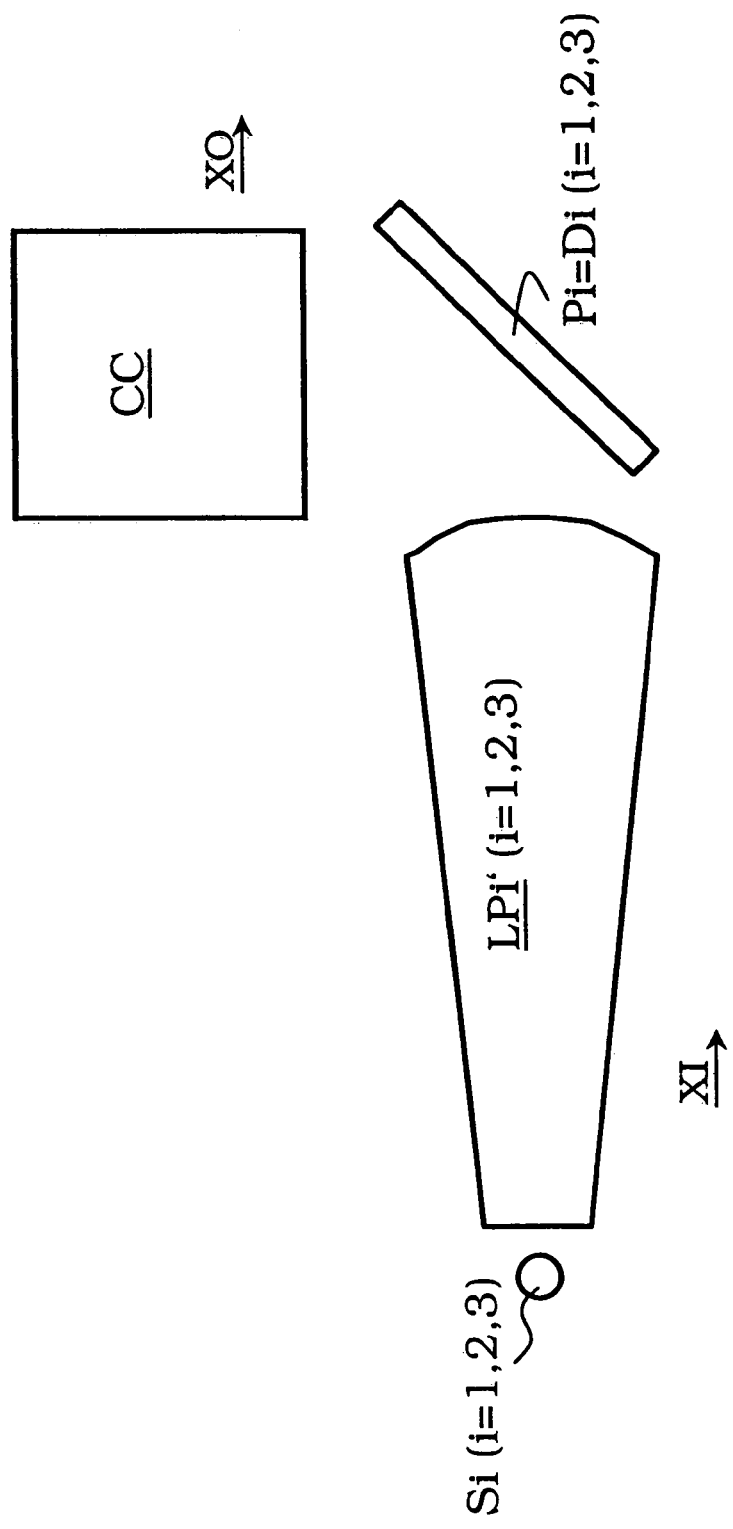
Figure 8B:
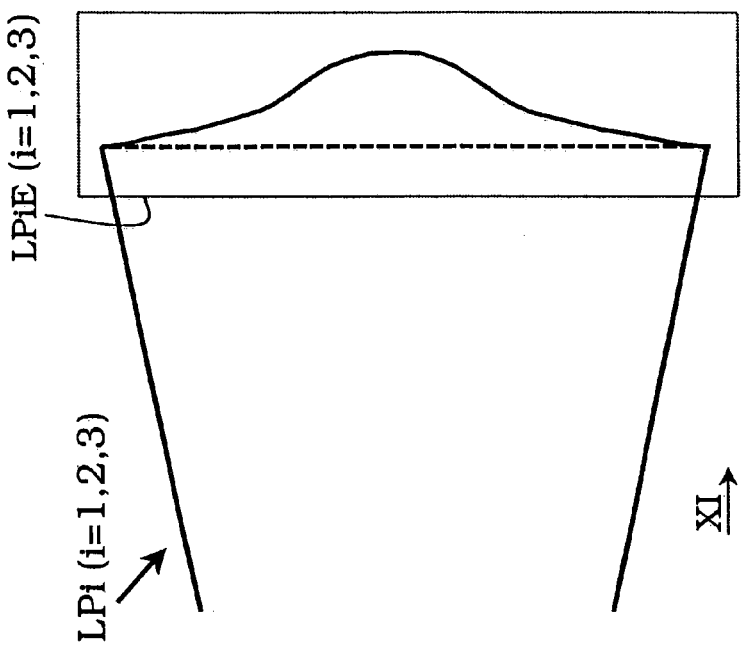
Figure 8A:
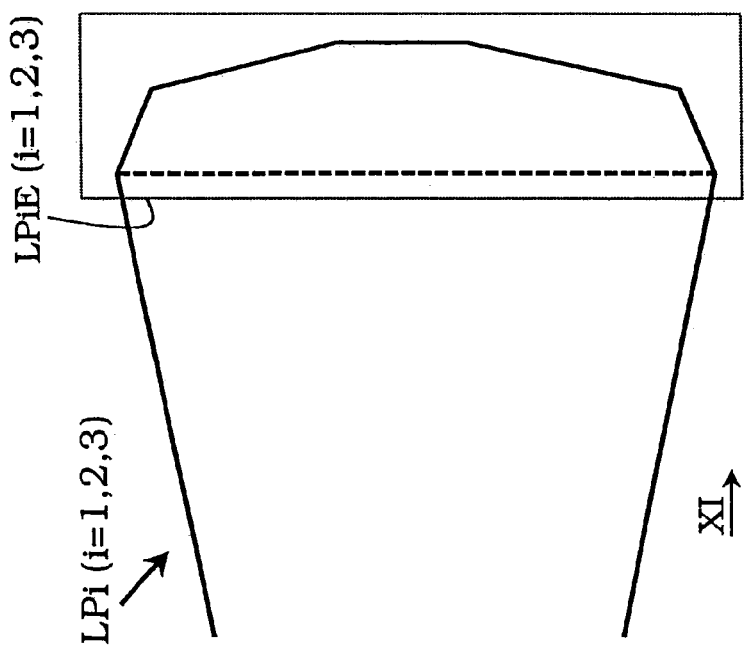
Figures 8C, 8D:
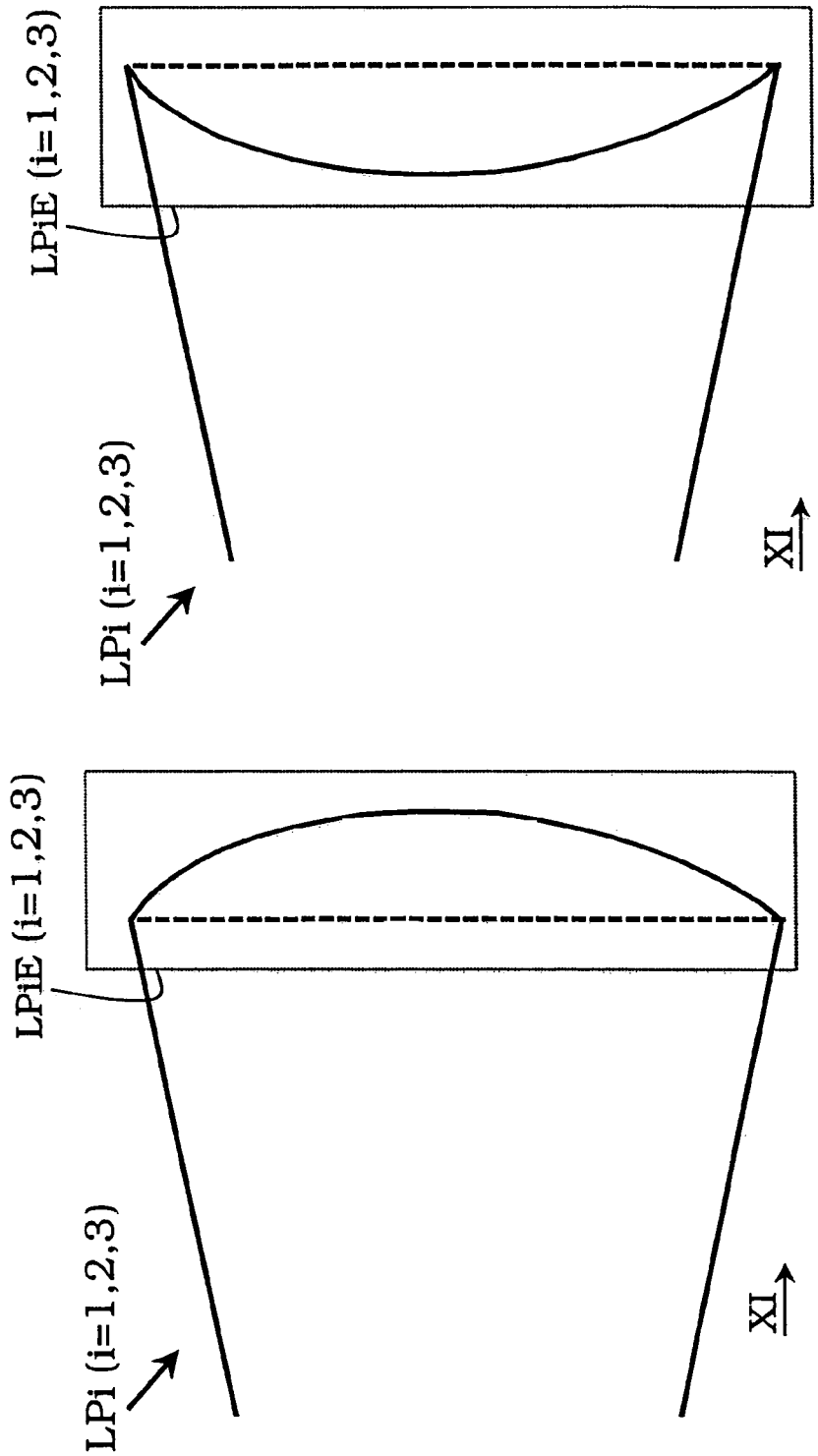
Figure 8F:
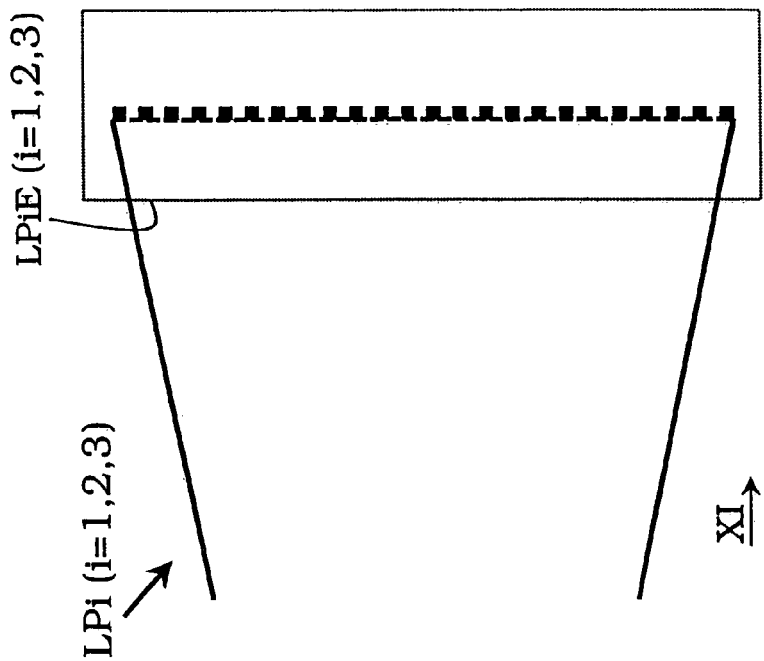
Figure 8E:
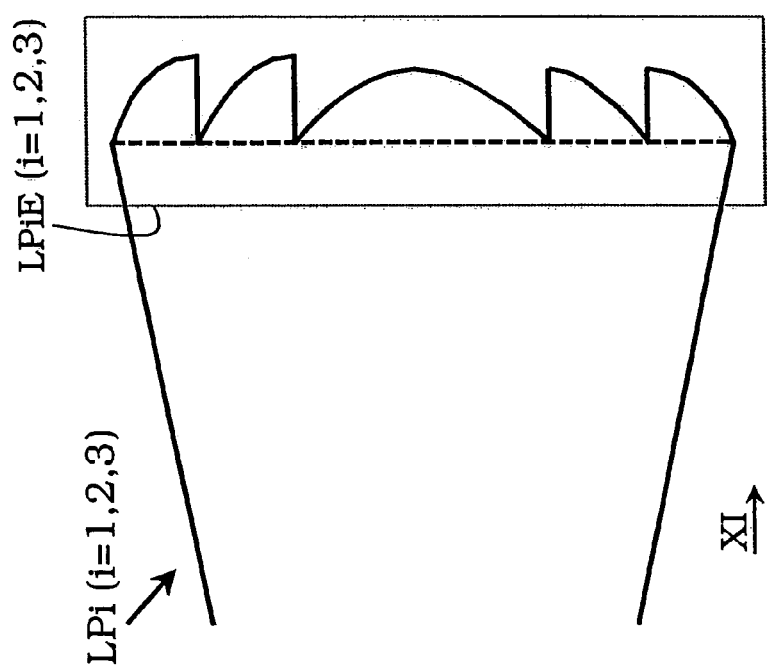

FIGS. 7A, B are schematical and cross-sectional views of two further embodiments of the inventive image generation unit.

FIGS. 8A-F demonstrate by means of schematical and cross-sectional views light output sections of different light pipes as light collecting and integrating units which might be used in accordance with the present invention.

Figure 9:
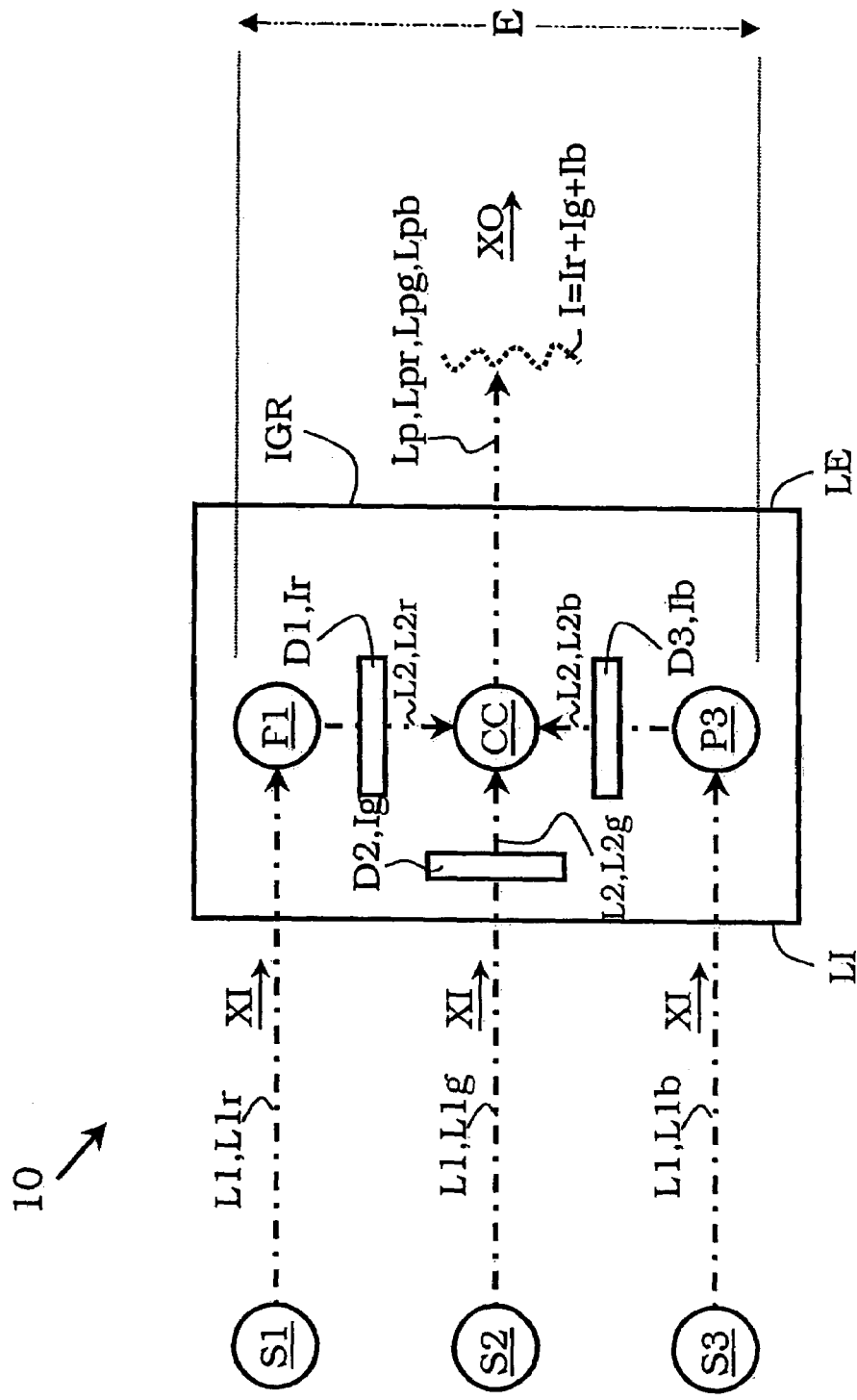
Figure 10:
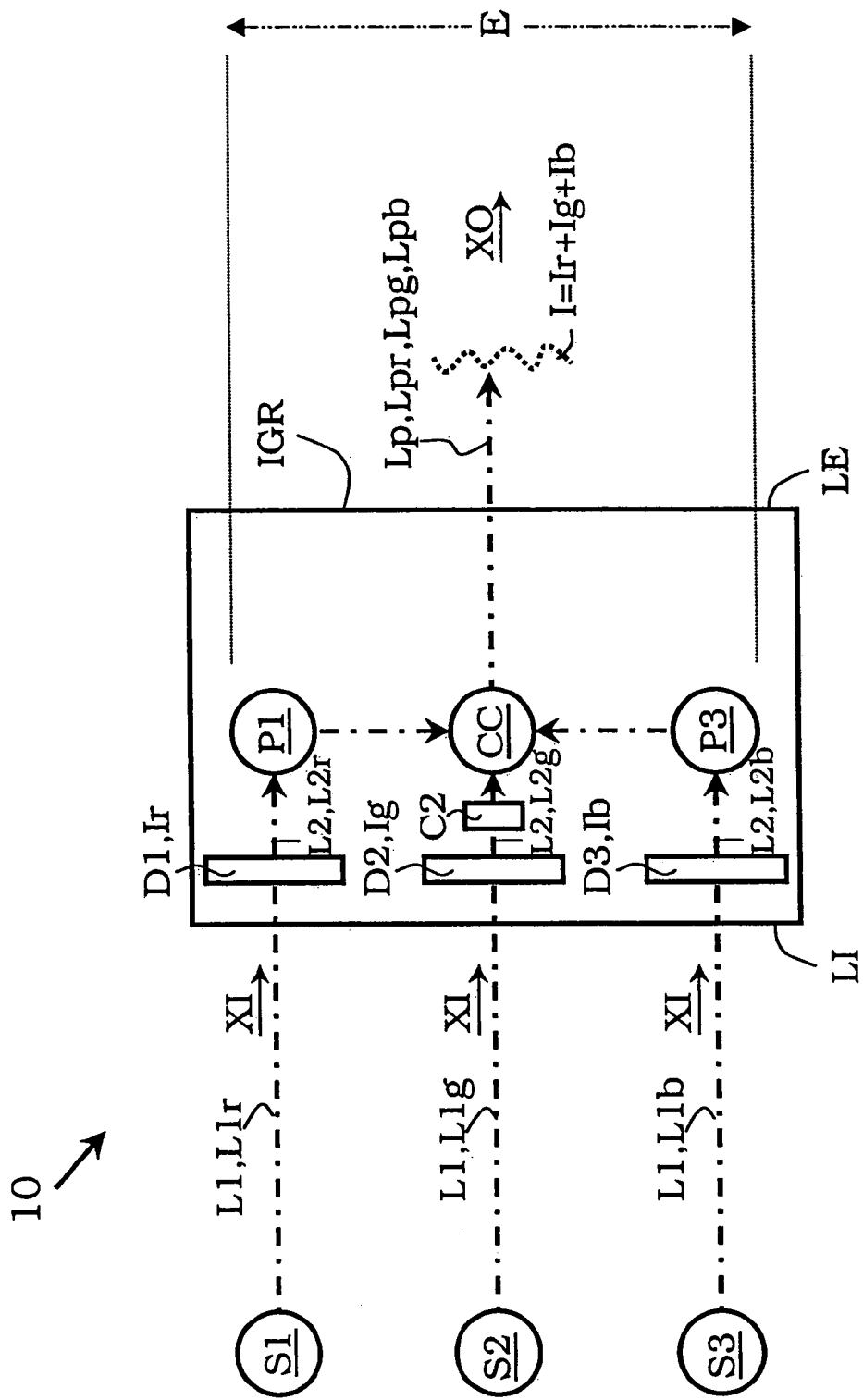

FIGS. 9, 10 are schematical and cross-sectional views which demonstrate basic principles of the present invention.

Figure 11:
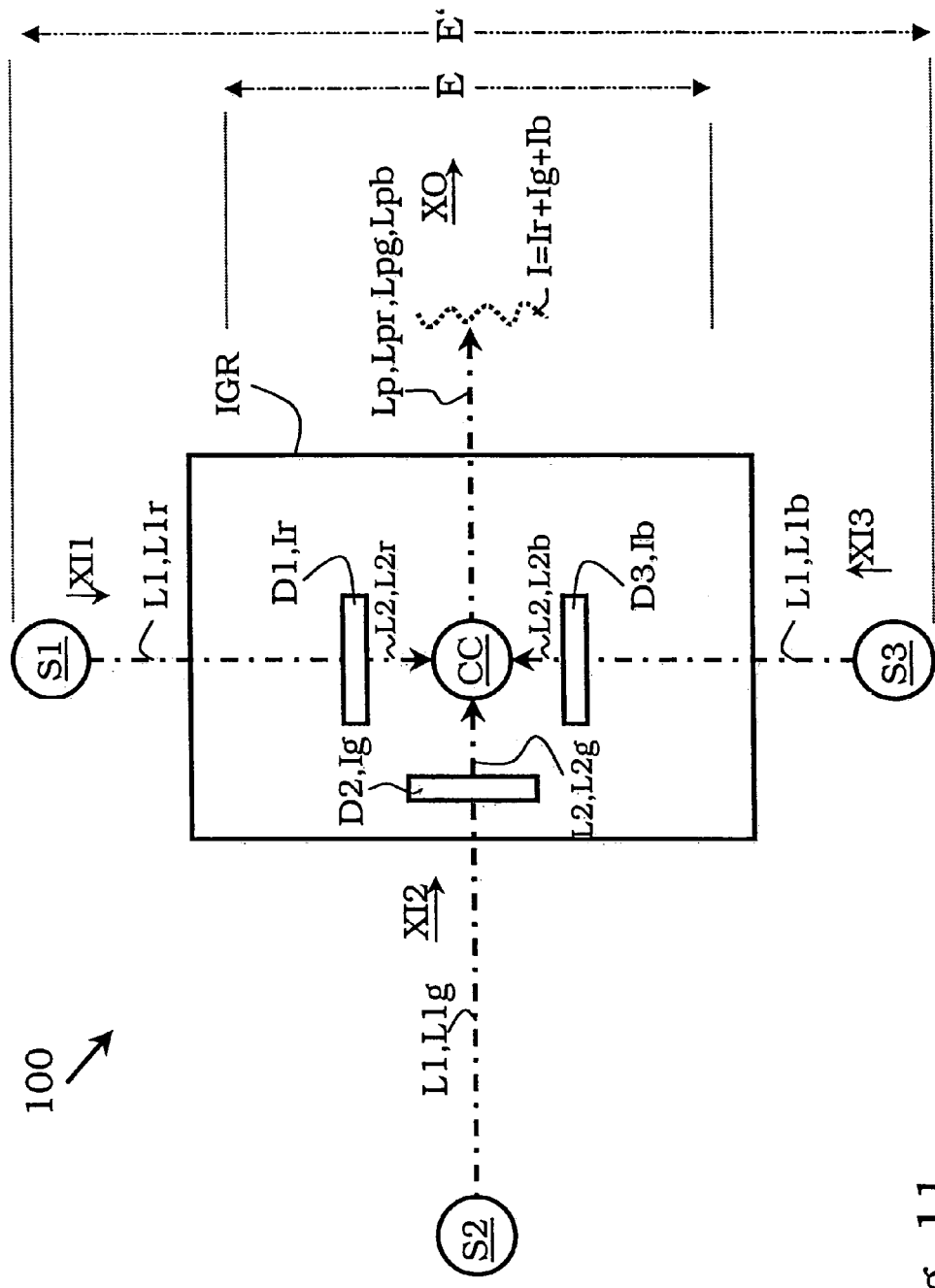

FIG. 11 is a schematical and cross-sectional view of a prior art image generation unit.

FIG. 12 is a schematical and cross-sectional view of a prism used as a deflecting unit in an embodiment of the present invention.

In the following, elements which have similar or comparable or equivalent functionalities or structures are denoted with the same reference symbols. A detailed description of these elements is not repeated in each case of their occurrence.

First of all the basic principles of the inventive image generation unit will be described by taking reference to FIGS. 9, 10, and 11.

FIG. 9 demonstrates the basic principles and essential features of an image generation unit 10 according to the present invention by means of a schematical block diagram.

The embodiment shown in FIG. 9 comprises a first, a second, and a third light source unit S1, S2, and S2. Said first, second, and third light source units S1, S2, S3 are adapted in order to generate and emit first, second, and third primary illumination light components L1r, L1g, L1b, respectively, which are emitted into a common input direction XI. Therefore the combination of said primary illumination light components L1r, L1g, L1b forms the desired primary illumination light L1. Said respective first, second, and third primary illumination light components L1r, L1g, L1b, respectively, are referred to as light components for first, second, and third images Ir, Ig, and Ib, respectively, to be generated and to be brought in superposition in order to generate, project and display an image I. Said first, second, and third primary illumination light components L1r, L1g, and L1b can be referred to as complementary and essentially non-overlapping spectral components, for instance of white light.

The embodiment of FIG. 9 further comprises an image generation and light re-directing arrangement IGR which has a light incidence section LI or light incidence face or surface LI which is arranged and adapted in order to receive said first, second, and third primary illumination light components L1r, L1g, L1b from a common input direction XI. Said image generation and light re-directing arrangement IGR further comprises a light exit section LE or light exit surface or face LE. Said image generation and light re-directing arrangement IGR is adapted and/or arranged in order to receive said first, second, and third primary illumination light components L1r, L1g, L1b or a derivative thereof in order or as to generate said first, second, and third partial images Ir, Ig, Ib for said image I to be displayed. Thereby, said image generation and light re-directing arrangement IGR generates first, second, and third projection light components Lpr, Lpg, Lpb, respectively as light of said generated first, second, and third partial images Ir, Ig, and Ib, respectively. As can be seen from FIG. 9 said image generation and light re-directing arrangement is also adapted and/or arranged in order to emit or irradiate or re-direct said first, second, and third projection light Lpr, Lpg, Lpb as light of said first, second, and third partial images Ir, Ig, Ib, respectively into or along an essentially common output direction XO and in particular via said light exit section LE.

It is an essential idea that according to the fact that said first, second, and third light source units S1, S2, S3 are arranged and/or adapted in order to emit said first, second, and third primary illumination light components L1r, L1g, L1b of said primary illumination light L1 or a derivative thereof into or along an essentially common input direction XI the extension or volume is reduced, in particular in the direction perpendicular to the common optical output path or common output direction XO for said first, second, and third partial images Ir, Ig, and Ib.

Beside these basic aspects the embodiment shown in FIG. 9 also comprises first, second, and third image generation means D1, D2, and D3, respectively which are, e.g. in this case transmittive LCD micro display panels and which in order to their basic functionality accordingly generate said respective first, second, and third partial images Ir, Ig, and Ib, respectively.

In order to direct the received first and third primary illumination light components L1r and L1b from said common input direction XI to the first and third image generation means D1 and D3, respectively. First and third deflection means or deflection means P1 or P3 are respectively provided in the respective optical paths for said first and third primary illumination light components L1r and L1b.

As can be seen from FIG. 9 the light entrance or light incidence section LI and the light exit section LE of said image generation and light re-directing unit IGR are oriented parallely to each other. Said second image generation means D2 for said second partial image Ig is also oriented parallely to said light incidence section LI of said image generation and light re-directing arrangement or unit IGR. Therefore, no second deflection element or means P2 has to be provided for said second primary illumination light component L1g in order to direct said second primary illumination light component L1g to said second image generation means D2. In contrast, said first and third image generation means D1 and D3 for said first and third partial images Ir and Ib, respectively, are oriented parallely with respect to each other and perpendicularly with respect to said light incidence section LI of said image generation and light re-directing arrangement IGR. Therefore respective first and third deflecting elements P1 and P3 are necessary which in turn reduce the volume or extension of the embodiment FIG. 9 when compared to prior art or known image generation units as far as example shown in FIG. 11.

Finally a light combination and re-directing unit CC has to be mentioned which is arranged and adapted in order to receive first, second, and third secondary illumination light components L2r, L2g, L2b, respectively or derivatives thereof of secondary illumination light from said first, second, and third image generation means, D1, D2, D3, respectively in order to collect and recombine these first, second, and third secondary illumination light components L2r, L2g, and L2b in order to re-direct them as first, second, and third projection light components Lpr, Lpg, and Lpb for projection light Lp into said common output direction XO.

The embodiment shown in FIG. 10 is very similar to the embodiment shown in FIG. 9. However, said first, second, and third image generation means D1, D2, and D3 have a different orientation with respect to said light incidence section LI in the embodiment shown in FIG. 10. Here all of said first, second, and third image generation means D1, D2, and D3, respectively are oriented parallely with respect to said light incidence section LI of said image generation and light re-directing arrangement IGR. Therefore, said first, second, and third image generation means D1, D2, and D3, respectively are positioned directly before said first and third deflection elements P1 and P3, respectively. A compensation element C2 is provided in order to compensate the differences of the optical path or light path for the second secondary illumination component when compared to the optical paths or light paths for said first and said third secondary illumination light components.

In contrast to the invention the prior art concept shown in FIG. 11 uses instead of one single and common input direction XI for the supply of said first, second, and third primary illumination components L1r, L1g, and L1b, respectively three different input directions XI1, XI2, XI3, respectively, which are in their direction parallely oriented to the normal of the first, second, and third image generation means D1, D2, D3, respectively, the latter having an arrangement as shown in the embodiment of FIG. 9.

Consequently the prior art image generation unit 100 of FIG. 11 shows an enlarged geometrical extension E' or volume.

Figure 1A:
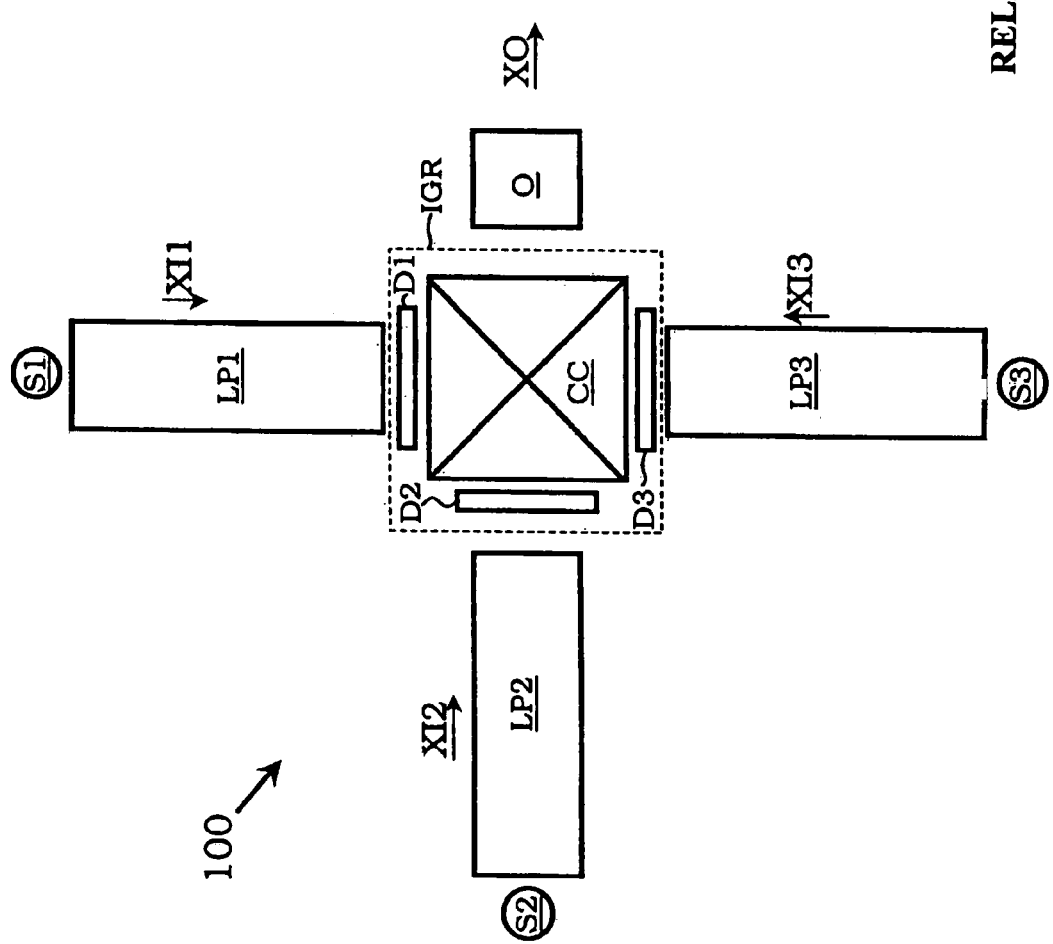

FIG. 1A illustrates some further details of the prior art image generation unit 100. In the embodiment shown in FIG. 1A which essentially has a structure as shown in FIG. 11 light pipes LP1, LP2, LP3 are provided as light collecting and integrating units between the light source units S1, S2, S3, respectively and the image generation means D1, D2, D3, respectively. The light combination and re-directing unit CC is built up by an colour cube which emits the projection light components Lpr, Lpr, Lpb into an projection optical unit O.

Again the three different input directions XI1, XI2, and XI3 and the enlarged volume or extension E' are indicated.

Figure 1B:
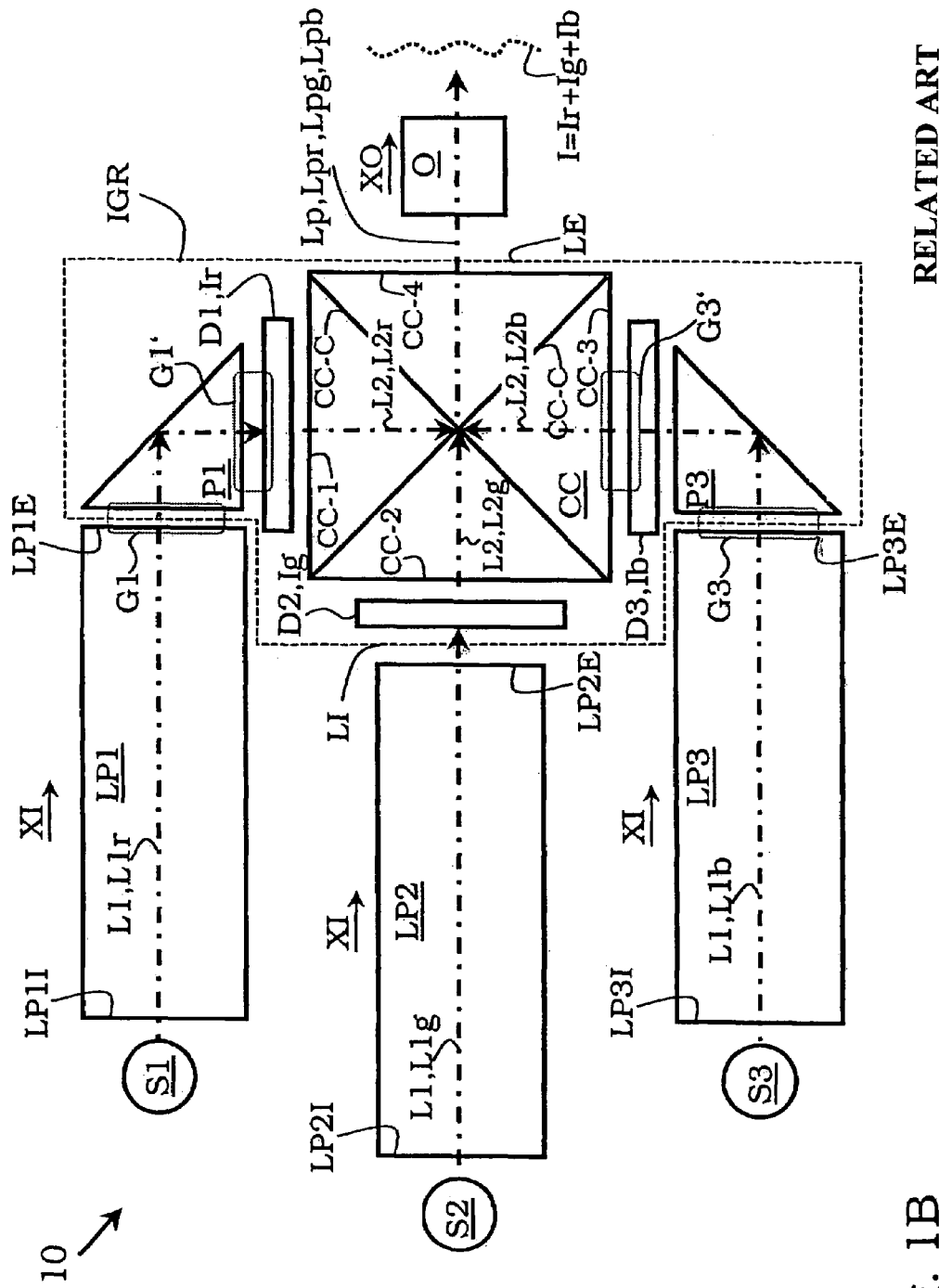
Figure 2A:
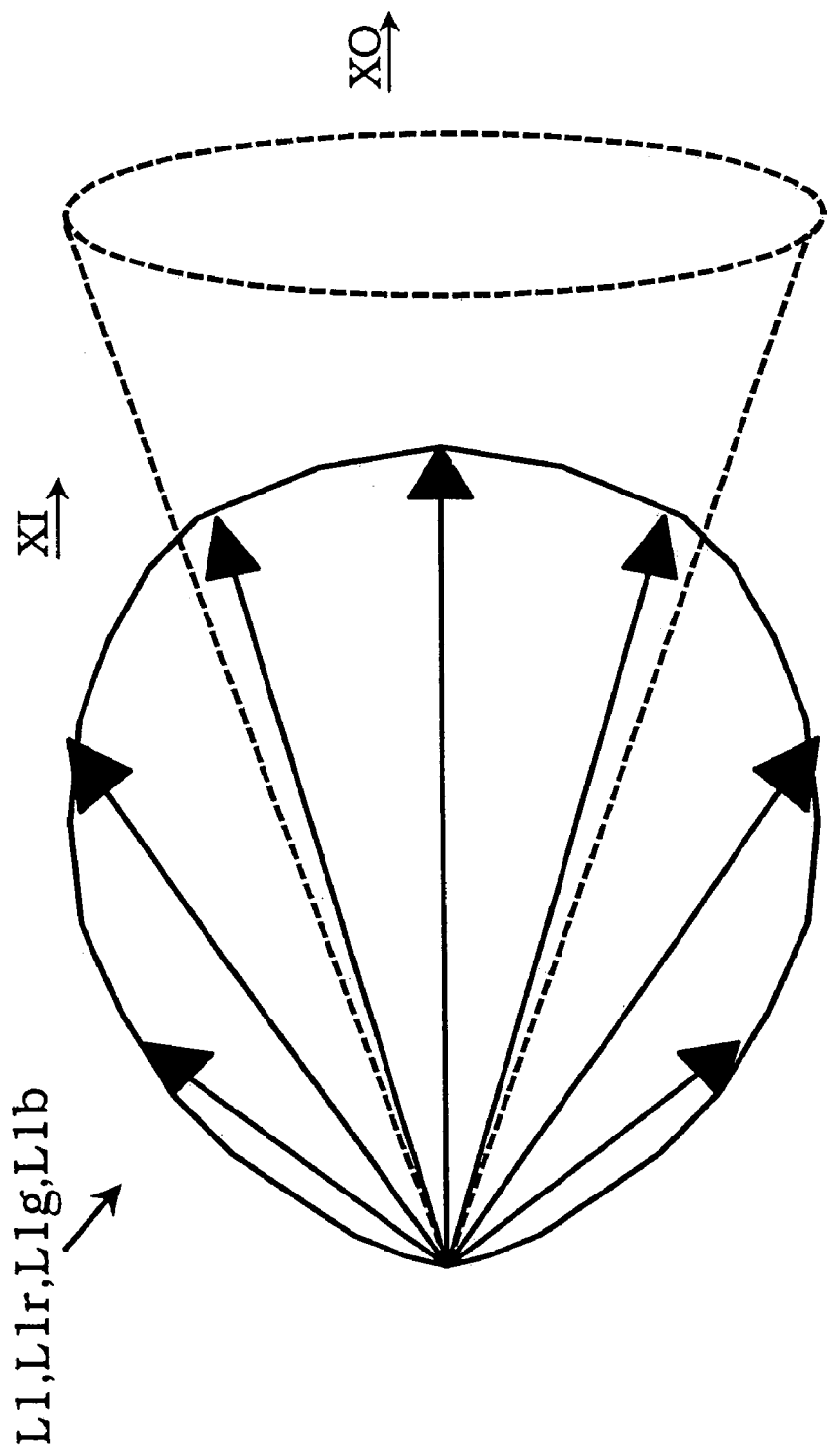
Figure 2B:
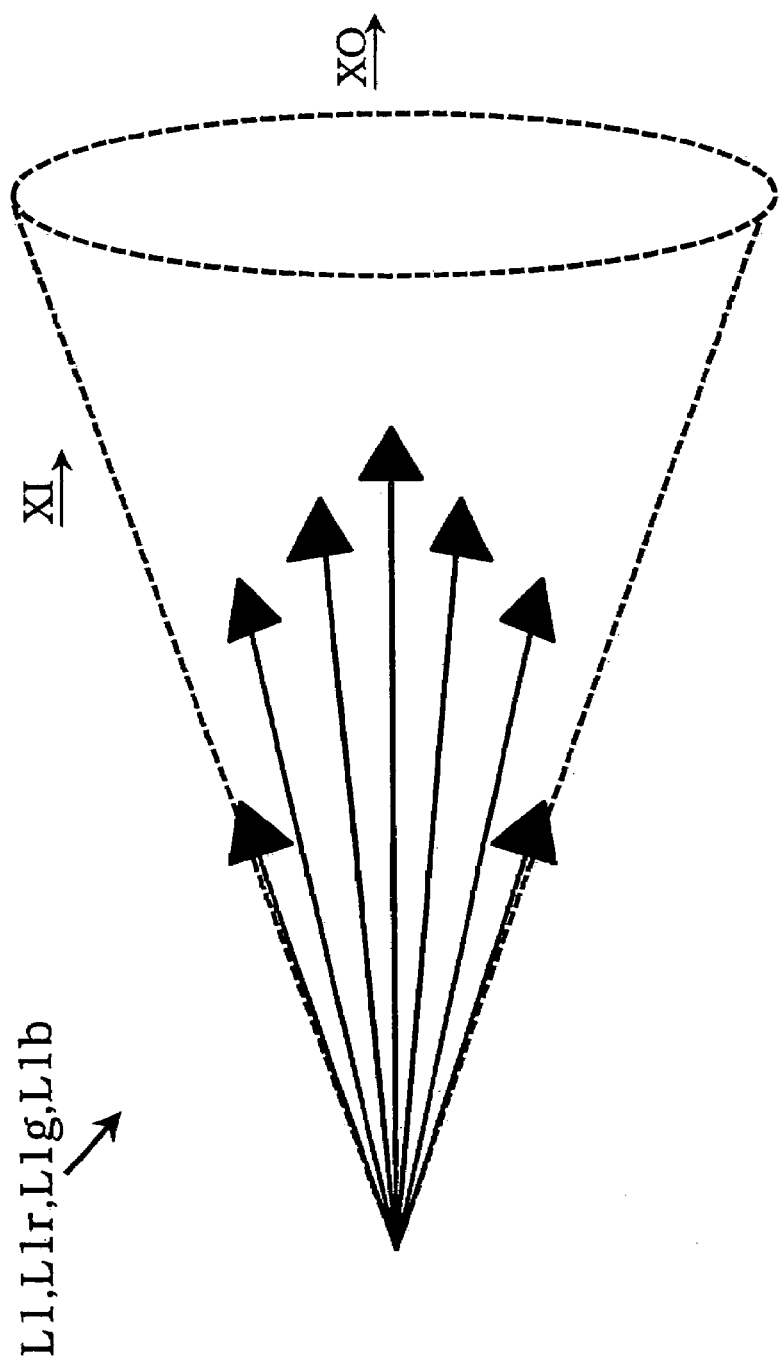
Figure 3A:
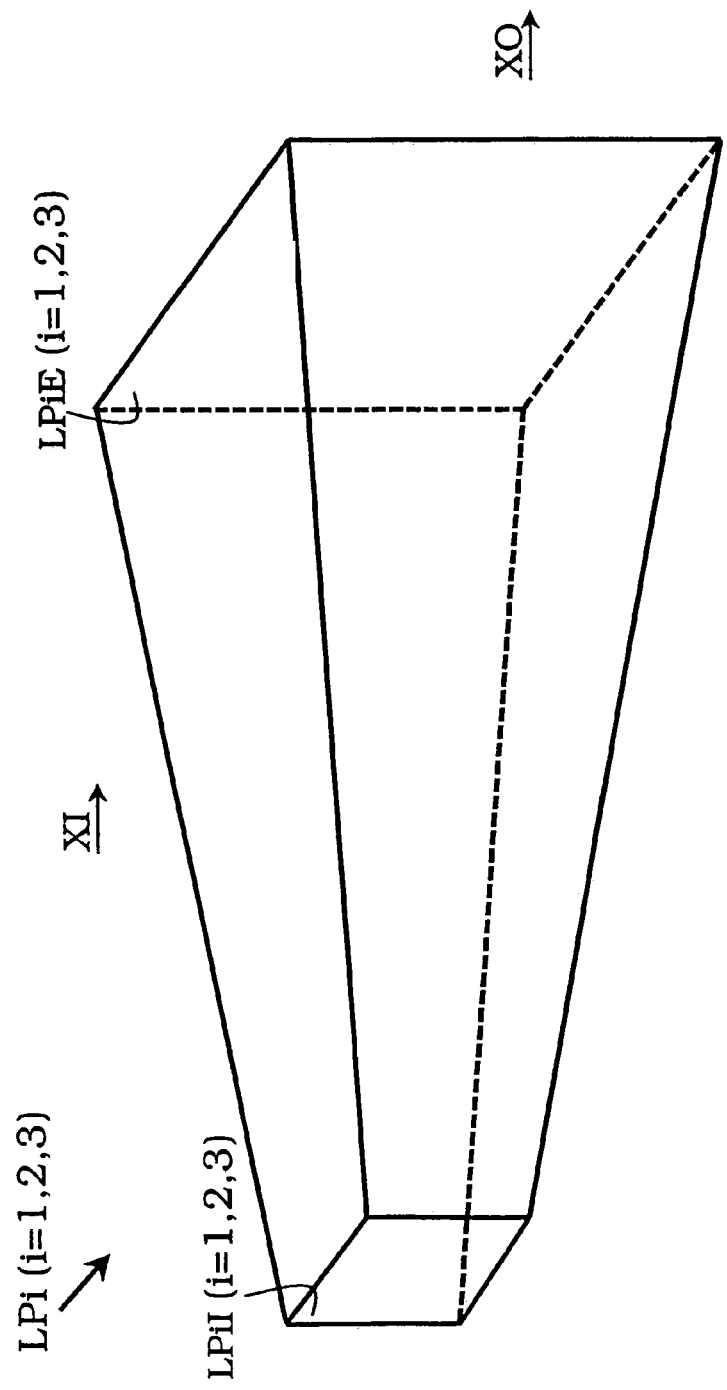
FIG. 3A is a schematical and perspective view of an embodiment of a light pipe which might be used as a light collecting and integrating unit within the present invention.
Figure 3B:
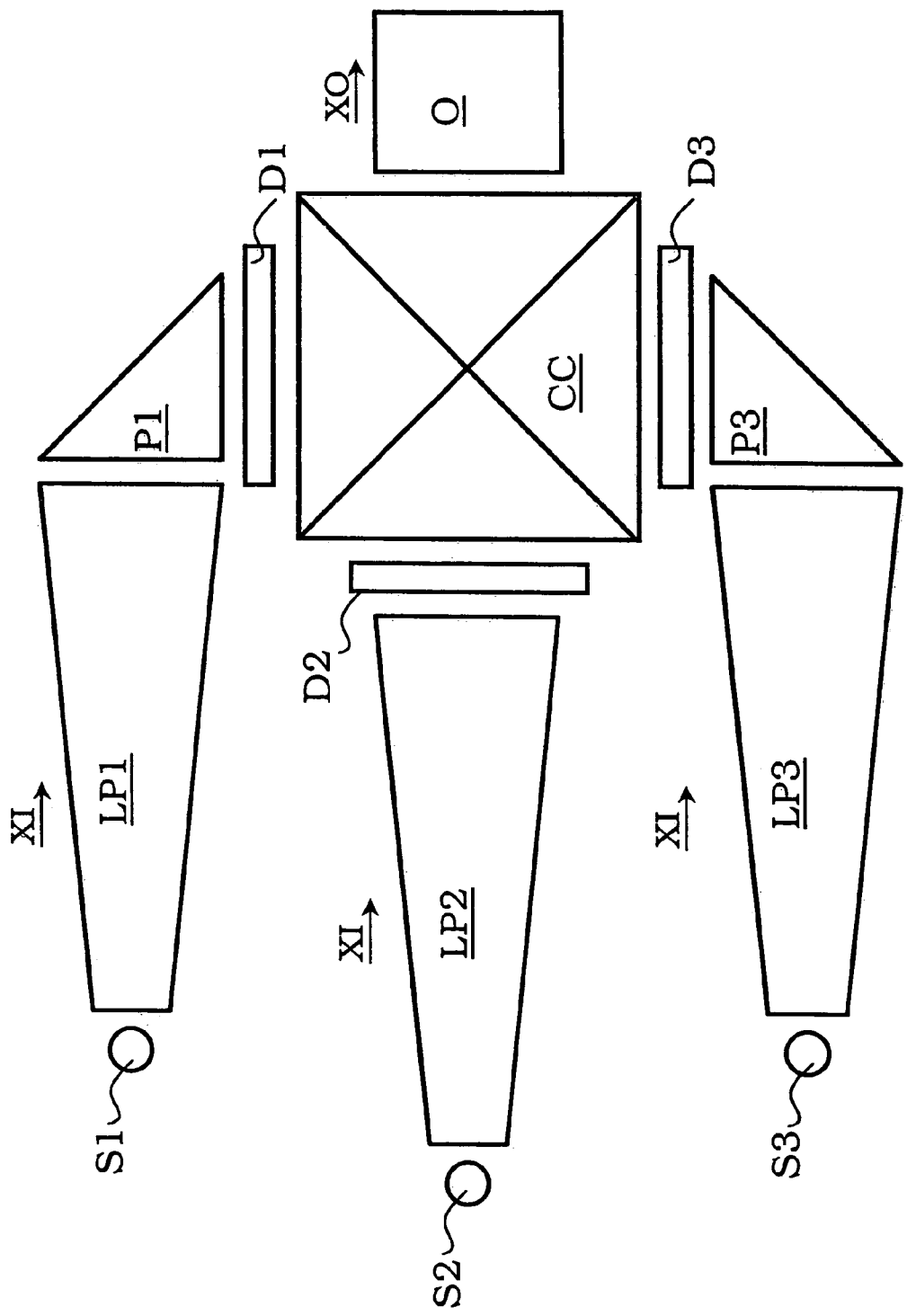
FIG. 3B is a schematical and cross-sectional view of an embodiment of the present invention wherein the light pipe of FIG. 3A is employed.

FIG. 1B is an embodiment similar to that shown in FIG. 9.

Additionally here also the light collecting and integrating units LP1, LP2, LP3 for said first, second, and third primary illumination light components L1r, L1g, L1b, respectively, are shown. Each of said light pipes LPi (i=1, 2, 3) comprises a light incidence surface or section LPiI and an light output or exit section or surface LPiE (i=1, 2, 3). After the collecting and light integrating process which in turn realizes a uniform light distribution for each of said first, second, and third primary illumination light components L1r, L1g, L1b, respectively, these components enter the image generation and light re-directing arrangement IGR via its light incidence section or surface LI.

First and third deflection elements P1 and P3 for said first and third primary illumination light components L1r, L1b respectively are formed by first and third prisms P1 and P3, respectively.

The light combination and re-directing unit CC is built up by a colour cube. Said light combination re-directing unit CC comprises first, second, third, and fourth faces CC-1, CC-2, CC-3, and CC-4. Said first to third faces CC-1, CC-2, and CC-3 are adapted in order to receive said first, second, and third secondary illumination light components L2r, L2g, and L2b, respectively or a derivative thereof as light of said first, second, and third partial images Ir, Ig, and Ib, respectively. One or a plurality of interfaces CC-C is/are provided which are arranged and/or adapted in order to transfer by transmission or reflection said first, second, and third secondary illumination light components L2r, L2g, L2b as first to third projection light components Lpr, Lpg, Lpb from said first, second, and third and third faces CC-1, CC-2, and CC-3, respectively, to said fourth face CC-4 and in particular to the light exit section or surface LE of said image generation and light re-directing arrangement IGR and further in particular in the direction of said common output direction XO.

By employing an projection optics O the image I to be displayed is generated as a superposition of said partial images Ir, Ig, and Ib, respectively. The features and embodiments of FIGS. 2A to 8F have already been described above.

FIG. 12 demonstrates by means of a schematical and cross-sectional view a prism P1, P3 which can be used as a light deflecting unit P1, P3 to realize an embodiment of the present invention.

In the embodiment shown in FIG. 12 the prism P1, P3 is a triangular 90° prism having a light incidence face or section P1I, P3I and a light exit face or section P1E, P3E which are both optically polished. Additionally, a diagonal face or section P1D, P3D is provided which having a reflecting or mirror cover in order to ensure an internal reflection functionality or property of the prism P1, P3. The upper and lower cover faces P1C, P3C are also optically polished in order to ensure total internal reflection properties at the respective interfaces.

REFERENCE SYMBOLS 10 image generation unit or image generation device according to the present invention
100 conventional image generation unit or image generation device
BS beam splitting element, beam splitting device
C2 compensation element for optical/light path
CC image generation and light re-directing unit, colour cube
CC-1 first face/surface
CC-2 second face/surface
CC-3 third face/surface
CC-4 fourth face/surface
D1 first image generation means
D2 second image generation means
D3 third image generation means
E geometrical extension, volume according to the present invention
E' geometrical extension, volume according to prior art
IGR image generation and light re-directing arrangement
Ir first partial image
Ig second partial image
Ib third partial image
L1 primary illumination light
L1r first primary illumination light component
L1g second primary illumination light component
L1b third primary illumination light component
L2 secondary illumination light
L2r first secondary illumination light component
L2g second secondary illumination light component
L2b third secondary illumination light component
LE light exit section, light exit surface
LI light incidence section, light incidence surface
LP1 first light collecting and/or integrating unit, first light pipe
LP1E first light exit section/surface
LP1I first light incidence section/surface
LP2 second light collecting and/or integrating unit, second light pipe
LP2E second light exit section/surface
LP2I second light incidence section/surface
LP3 third light collecting and/or integrating unit, third light pipe
LP3E third light exit section/surface
LP3I third light incidence section/surface
Lp projection light
Lpr first projection light component
Lpg second projection light component
Lpb third projection light component
O optical projection unit, projection optics, objective
P1 first deflecting element, first prism
P1C cover face, cover section P1D diagonal face, diagonal section
P1E light exit face, light exit section
P1I light incidence face, light incidence section
P3 third deflecting element, third prism
P3C cover face, cover section
P3D diagonal face, diagonal section
P3E light exit face, light exit section
P3I light incidence face, light incidence section
S1 first light source unit, first light source
S2 second light source unit, second light source
S3 third light source unit, third light source
XI common input direction, common input axis
XI1 first input direction
XI2 second input direction
XI3 third input direction
XO common output direction, common optical output path

REFERENCE LITERATURE (1) U.S. Pat. No. 4,382,656
(2) US 2003/021530

The invention claimed is:

1. Image generation unit, comprising:
a first, a second, and a third light source unit configured to generate and emit respective first, second, and third primary illumination light components of primary illumination light as light for a first, a second, and a third partial image to be generated for an image to be displayed; and
an image generation and a light redirecting arrangement configured to receive said first, second and third primary illumination light components or a derivative thereof in order to generate said first, second, and third partial images for said image to be displayed and to generate first, second, and third projection light components as light of said first, second and third partial images, respectively, and to emit said first, second, and third projection light components as light of said first, second and third partial images, respectively into or along a common output direction and
at least a first and a second light collecting and integration unit,
wherein said first and second light collecting and integration unit are arranged directly after said first and said second light source unit, respectively, wherein said first and said second light collecting and integration unit have a monotonically increasing cross-section along a respective optical axis when taken from their respective light incidence face to their respective light exit faces and wherein said first and said second light collecting and integration units have beam shaping properties with respect to said first and second primary illumination light components of said primary illumination light, said beam shaping properties being realized via geometrical properties of the respective light exit faces of said first and said second light collecting and integrating units, respectively.

2. Image generation unit according to claim 1, wherein said image generation and light re-directing arrangement is arranged to receive said first, second and third primary illumination light components from a common direction.

3. Image generation unit according to claim 1, wherein said image generation and light re-directing arrangement is arranged to receive said first, second, and third primary illumination light components via a common light incidence section or light incidence face thereof.

4. Image generation unit according to claim 1, wherein said image generation and light re-directing arrangement comprises a first, a second and a third image generation means configured to receive said first, second, and third primary illumination light components respectively, or a derivative thereof and in order to generate and emit secondary illumination light components of secondary illumination light as light of said first, second, and third partial images, respectively.

5. Image generation unit according to claim 4, wherein said first, second, and third image generation means are transmittive or reflective micro displays.

6. Image generation unit according to claim 1,
wherein said first, second and/or a third light collecting and integration units are configured to receive, integrate and uniformize said first, second, and/or third primary illumination light components, respectively, of said primary illumination light or a derivative thereof, and
wherein said first, second, and third light collecting and integration units are configured to emit and direct said first, second, and/or third primary illumination light components, respectively, of said primary illumination light or a derivative thereof as said light for said first, second, and third partial images, respectively, to be generated to said image generation and light re-directing arrangement.

7. Image generation unit according to claim 1, wherein said first, second, and/or third light collecting and/or integrating unit are arranged in order to have a common orientation, direction and/or emission direction for said integrated primary illumination light components.

8. Image generation unit according to claim 1, wherein said first, second, and third light collecting and integrating units are plain or hollow light pipes and/or integration rods each having a light incidence face and opposing light exit face which are parallel oriented with respect to each other.

9. Image generation unit according to claim 1, wherein said beam shaping properties are realized via the the shape or profile of the respective light exit faces or sections of said first, second, and third light collecting and integrating units, respectively.

10. Image generation unit according to claim 1, wherein the respective light exit faces or sections of said first, second, and third light collecting and integrating units or a part or parts thereof have a shape or profile chosen from the group of shapes or profile which consists of concave, piece-wise concave, convex, piece-wise convex, piece-wise flat, spherical, elliptical, polynomial, fresnel-type shapes or profiles or any combination thereof.

11. Image generation unit according to claim 1, wherein said respective light exit faces or sections of said first, second, and third light collecting and integrating units or a part or parts thereof are or comprise a diffractive optical element.

12. Image generation unit according to claim 1, wherein said image generation and light re-directing arrangement comprises a light combination and re-directing unit configured to:
receive said first, second, and third secondary illumination light components, respectively, of said secondary illumination light or a derivative thereof as light of said first, second, and third partial images, respectively, and
re-direct and emit said first, second, and third secondary illumination light components, respectively, of said secondary illumination light or a derivative thereof as light of said first, second, and third partial images, respectively, into or along said essentially common output direction or output axis and in particular into or along said essentially common optical output path as said first, second, and third projection light components, respectively, of said first, second, and third partial images, respectively.

13. Image generation unit according to claim 12, wherein said light combination and re-directing unit comprises a first face configured to receive said first secondary illumination light component of said secondary illumination light or a derivative thereof as light of said first partial image directly or indirectly from said light incidence section of said image generation and light re-directing arrangement.

14. Image generation unit according to claim 12, wherein said light combination and re-directing unit comprises a second face configured to receive said second secondary illumination light component of said secondary illumination light or a derivative thereof as light of said second partial image directly or indirectly from said light incidence section of said image generation and light re-directing arrangement.

15. Image generation unit according to claim 12, wherein said light combination and re-directing unit comprises a third face configured to receive said third secondary illumination light component of said secondary illumination light or a derivative thereof as light of said third partial image directly or indirectly from said light incidence section of said image generation and light re-directing arrangement.

16. Image generation unit according to claim 12, wherein said light combination and re-directing unit comprises a fourth face configured to output said received first, second, and third secondary illumination light components of said secondary illumination light or a derivative thereof as light of said first, second, and third partial images, respectively, to said light exit section of said image generation and light re-directing arrangement into or along said common output direction.

17. Image generation unit according to claim 12, wherein said light combination and/or re-directing unit comprises a spectral and/or polarisation selective or selecting interface configured to:
reflect said first, secondary illumination light component of said secondary illumination light or a derivative thereof as light of said first partial image from said first face of said light combination and re-directing unit to said fourth face of said light combination and re-directing unit,
transmit said second secondary illumination light component of said secondary illumination light or a derivative thereof as light of said second partial image from said second face of said light combination and re-directing unit to said fourth face of said light combination and re-directing unit, and
reflect said third secondary illumination light component of said secondary illumination light or a derivative thereof as light of said third partial image from said third face of said light combination and re-directing unit to said fourth face of said light combination and re-directing unit.

18. Image generation unit according to claim 12,
wherein said second face of said light combination and re-directing unit is oriented parallel to said light incidence section of said image generation and light re-directing arrangement or as a part thereof and/or
wherein said fourth face of said light combination and re-directing unit is oriented parallel to said light exit section of said image generation and light re-directing arrangement or as a part thereof.

19. Image generation unit according to claim 12, wherein said first face and/or third face of said light combination and re-directing unit are oriented perpendicular to said light incidence section and/or to said light exit section of said image generation and a light re-directing arrangement.

20. Image generation unit according to claim 12, wherein said first and third faces of said light combination and re-directing unit are oriented parallel with respect to each other and/or essentially perpendicular with respect to said second and/or said fourth face of said light combination and re-directing unit.

21. Image generation unit according to claim 12, wherein said second and fourth faces of said light combination and re-directing unit are oriented parallel with respect to each other and/or essentially perpendicular with respect to said first and/or said third face of said light combination and re-directing unit.

22. Image generation unit according to claim 12, wherein said light combination and re-directing unit is or comprises a color cube.

23. Image generation unit according to claim 1,
wherein at least between said first and/or third face of said light combination and re-directing unit and said first and/or third light source unit, respectively, is provided a first and/or third deflecting unit, respectively,
wherein said first and/or third deflecting units are configured to deflect said first and/or third primary illumination light component, respectively, of said primary illumination light or a derivative thereof as light for said first and/or third partial image, respectively, to be generated or said first and/or third secondary illumination light component, respectively, of said secondary illumination light or a derivative thereof as light of said first and/or said third partial image, respectively, from said essentially common input direction or axis to said first and/or third face, respectively, of said light combination and re-directing unit.

24. Image generation unit according to claim 23, wherein said first and/or third deflecting units are or comprise a first and/or third prism, respectively.

25. Image generation unit according to claim 24, wherein said first and/or said third prisms are 90° prisms.

26. Image generation unit according to claim 24, wherein said first and/or said third prisms are triangular prisms.

27. Image generation unit according to claim 24, wherein said first and/or said thirds prisms have a light incidence section or face and/or a light exit section or face which are optically polished.

28. Image generation unit according to claim 24, wherein said first and/or said third prisms have upper and lower cover sections or faces which are polished in order to ensure total internal reflection properties at the respective upper and lower cover sections or faces.

29. Image generation unit according to claim 24, wherein said first and/or said third prisms a diagonal section or face, which has mirror or reflecting properties with respect to the inside of the respective first and/or third prism in order to ensure internal reflection properties at the respective diagonal section or face.

30. Image generation unit according to claim 23, wherein said first and/or third deflecting unit are or comprise said first and/or said third image generation means, respectively.

31. Image generation unit according to claim 23, wherein said first and/or third deflecting unit are or comprise said first and/or said third image generation means, respectively, together with a respective first and/or third beam splitting arrangement.

32. Image generation unit according to claim 1, wherein between said first and/or said third deflection units on the one hand and said light recombination and redirecting unit on the other hand is provided a respective air gap structure.

33. Image generation unit according to claim 1, further comprising:
a third light collecting and integration unit, arranged directly after said third light source unit, wherein said third light collecting and integration unit has a monotonically increasing cross-section along a respective optical axis when taken from its respective light incidence face to its respective light exit face and wherein said third light collecting and integration unit has beam shaping properties with respect to said third primary illumination light component of said primary illumination light, said beam shaping properties being realized via geometrical properties of the respective light exit faces of said third light collecting and integrating unit.

34. Image generation unit according to claim 33, wherein between said first and said third light collecting and integrating units on one hand and said first and/or said third deflecting units respectively, on the other hand is provided a respective air gap structure.

35. Image generating unit according to claim 1, wherein said first, second, and third light source units are adapted to emit said first, second ad third primary illumination light components of said primary illumination light or a derivative thereof into or along a common input direction.

36. Image generation unit according to claim 35, wherein said first, second and third light source units are arranged to emit said first, second, and third primary illumination light components of said primary illumination light or a derivative thereof in parallel with respect to each other.

* * * * *